United States Patent
Davydov et al.

(10) Patent No.: US 10,312,986 B2
(45) Date of Patent: Jun. 4, 2019

(54) FLEXIBLE CSI RS CONFIGURATION FOR FD-MIMO SYSTEMS

(71) Applicant: INTEL CORPORATION, Santa Clara, CA (US)

(72) Inventors: Alexei Vladimirovich Davydov, Nizhny Novgorod (RU); Alexander Alexandrovich Maltsev, Nizhny Novgorod (RU); Gregory Vladimirovich Morozov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/753,960

(22) PCT Filed: Dec. 24, 2015

(86) PCT No.: PCT/RU2015/000924
§ 371 (c)(1),
(2) Date: Feb. 20, 2018

(87) PCT Pub. No.: WO2017/111649
PCT Pub. Date: Jun. 29, 2017

(65) Prior Publication Data
US 2018/0219601 A1  Aug. 2, 2018

Related U.S. Application Data

(60) Provisional application No. 62/207,215, filed on Aug. 19, 2015.

(51) Int. Cl.
*H04B 7/10* (2017.01)
*H04B 7/06* (2006.01)
*H04L 5/00* (2006.01)

(52) U.S. Cl.
CPC ......... *H04B 7/0626* (2013.01); *H04L 5/0048* (2013.01); *H04B 7/10* (2013.01)

(58) Field of Classification Search
CPC ............................ H04B 7/0626; H04L 5/0048
See application file for complete search history.

(56) References Cited

U.S. PATENT DOCUMENTS 5,852,630 A * 12/1998 Langberg ............ H04L 27/2647
   375/219
9,077,519 B2 * 7/2015 Kim ...................... H04L 5/0023
(Continued)

OTHER PUBLICATIONS

3GPP Standard, 3rd Generation Partnership Project; Technical Specification Group Radio Access Network; Evolved Universal Terrestrial Radio Access Mar. 12, 2013.
(Continued)

*Primary Examiner* — Siu M Lee
(74) *Attorney, Agent, or Firm* — Green, Howard, & Mughal LLP.

(57) ABSTRACT

Described are an eNB and a UE implementing a CSI-RS protocol. The eNB has an ordered set of antenna ports for a wireless communication channel with the UE, a first circuitry operable to compose CSI-RS configuration messages that assign to the UE various CSI-RS groups specifying one or more CSI-RS antenna ports, and a second circuitry to establish an ordered list of CSI-RS antenna ports. The UE has a set of antennas, a first circuitry operable to receive from the eNB various CSI-RS configuration messages assigning to it CSI-RS groups specifying one or more CSI-RS antenna ports, and a second circuitry operable to index CSI-RS antenna ports specified by the CSI-RS groups as an ordered list of CSI-RS antenna ports. The eNB may transmit CSI-RS to the configured UE, and the UE may perform channel state information measurements on the ordered list of CSI-RS antenna ports.

21 Claims, 20 Drawing Sheets

(56) References Cited

U.S. PATENT DOCUMENTS

| | | | |
|---|---|---|---|
| 2011/0170435 A1* | 7/2011 | Kim | H04L 5/0023 |
| | | | 370/252 |
| 2012/0176939 A1* | 7/2012 | Qu | H04L 5/0023 |
| | | | 370/255 |
| 2012/0208541 A1* | 8/2012 | Luo | H04W 72/082 |
| | | | 455/437 |
| 2012/0257515 A1* | 10/2012 | Hugl | H04W 24/10 |
| | | | 370/252 |
| 2013/0083681 A1* | 4/2013 | Ebrahimi Tazeh Mahalleh | |
| | | | H04L 5/0057 |
| | | | 370/252 |
| 2014/0177584 A1* | 6/2014 | Ouchi | H04W 52/146 |
| | | | 370/329 |
| 2016/0248562 A1* | 8/2016 | Nam | H04L 27/2601 |
| 2016/0270096 A1* | 9/2016 | Hoshino | H04L 5/0048 |
| 2018/0152324 A1* | 5/2018 | Park | H04B 17/309 |

OTHER PUBLICATIONS

International Search Report and Written Opinion for PCT Application No. PCT/RU2015/000924, dated Sep. 27, 2016.
ZTE, "Remaining issues on Non-Precoded CSI-RS", 3GPP Draft; R1-157482, 3rd Generation Partnership Project (3GPP), RAN WG1, Anaheim, CA, USA Nov. 24, 2015.

* cited by examiner

FLEXIBLE CSI RS CONFIGURATION FOR FD-MIMO SYSTEMS

CLAIM OF PRIORITY

This Application is a National Stage Entry of, and claims priority to, PCT Application Serial Number PCT/RU2015/000924, filed on Dec. 24, 2015 and entitled "Flexible CSI-RS Configuration For FD-MIMO Systems," which claims priority under 35 U.S.C. § 119(e) to U.S. Provisional Patent Application Ser. No. 62/207,215 filed Aug. 19, 2015 and entitled "Flexible CSI-RS Configuration For FD-MIMO," both of which are herein incorporated by reference in their entireties.

BACKGROUND

Channel State Information Reference Signals (CSI-RS) were introduced for LTE-Advanced (Long-Term Evolution) in Release 10 of the 3GPP (3rd Generation Partnership Project) specification. To use this feature, an eNB (Evolved Node-B) establishes a wireless communications channel with a UE (User Equipment), after which CSI-RS symbols are transmitted from the eNB to the UE. The UE performs channel state information measurements on the CSI-RS symbols in order to calculate channel state information. The UE then returns the channel state information to the eNB, in order to provide information to the eNB about the downlink signal quality for the wireless communications channel.

Meanwhile, Release 8 of the 3GPP specification provides for MIMO (Multiple Input Multiple Output) antenna configurations, and subsequent enhancements in Release 10 and Release 11 extend these provisions. MIMO may support beamforming to increase downlink channel quality. For Release 10, UEs may support 2-port antennas, 4-port antennas, or 8-port antennas. Under Release 13, UEs may support antennas comprising more ports, such as 12-port and 16-port antennas. Antennas comprising even greater numbers of ports are contemplated for Release 14, such as 32-port and 64-port antennas.

Through Release 11, the 3GPP specification is designed to support MIMO antenna configurations that are capable of adaptation in azimuth (i.e., a radial angle with respect to a reference angle in a horizontal plane). In future releases, however, the 3GPP specification may support FD-MIMO (Full-Dimensional MIMO) antenna configurations that are capable of adaptation in both azimuth and elevation.

Non-precoded CSI-RS may support FD-MIMO by facilitating channel state information measurement at the UE, which may in turn facilitate precoding selection for eNB antennas. At the same time, Release 13 will support the use of non-precoded CSI-RS with 12- and 16-port antennas.

BRIEF DESCRIPTION OF THE DRAWINGS

The embodiments of the disclosure will be understood more fully from the detailed description given below and from the accompanying drawings of various embodiments of the disclosure. However, while the drawings are to aid in explanation and understanding, they are only an aid, and should not be taken to limit the disclosure to the specific embodiments depicted therein.

DETAILED DESCRIPTION

Figure 1:
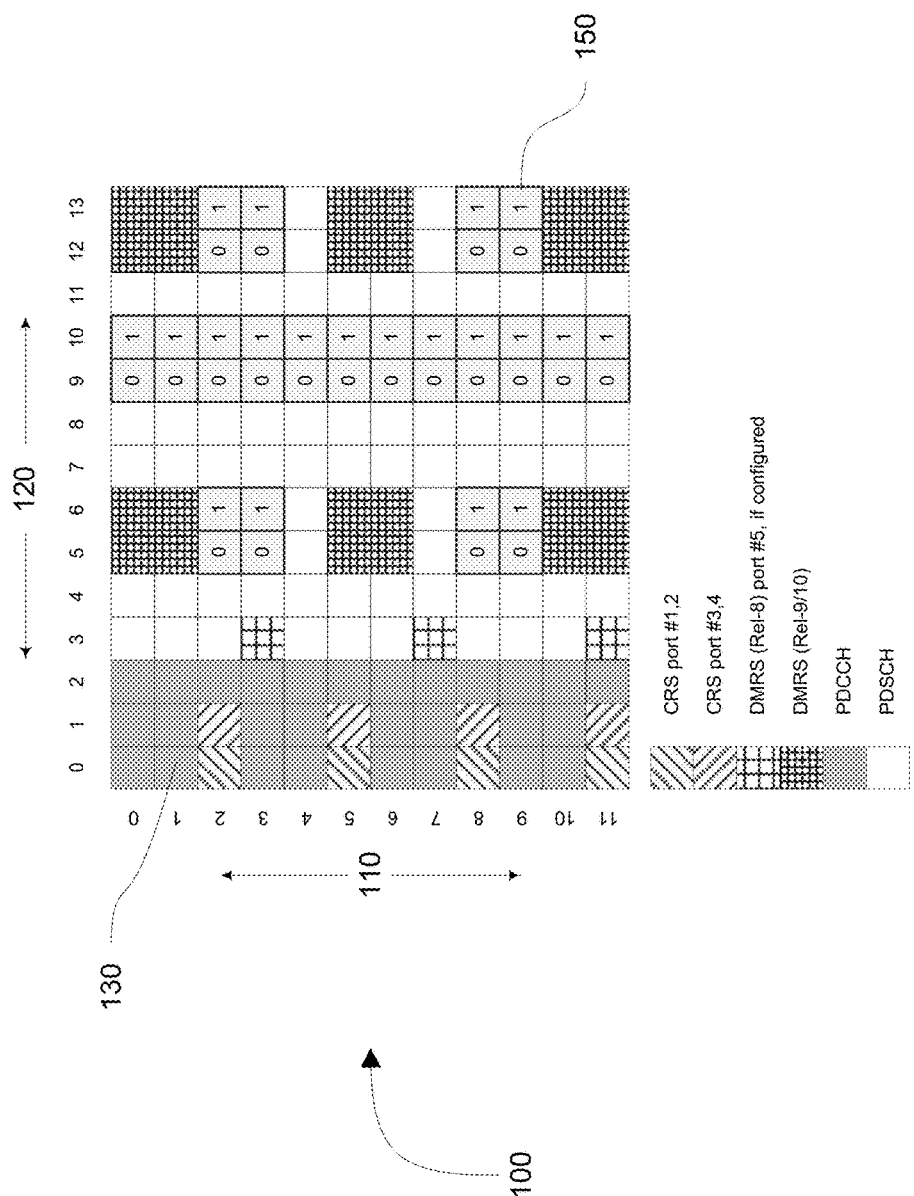
FIGS. 1-3 illustrate embodiments of CSI-RS antenna port allocations within downlink RBs (Resource Blocks), detailing which REs (Resource Elements) within the subframe are associated with which CSI-RS antenna ports.

The trend in 3GPP specification releases is to support wireless communication channels based upon higher numbers of antennas. In part, the trend toward higher numbers of antennas per channel is due to antenna configurations supporting MIMO, and in the future to antenna configurations supporting FD-MIMO.

A new CSI-RS protocol may advantageously support an ever-increasing numbers of antennas. At the same time, a new CSI-RS protocol may advantageously support more flexible assignment of antenna ports, which may lead to more optimal channel quality.

In the following description, numerous details are discussed to provide a more thorough explanation of embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical, mechanical, or magnetic connection between the things that are connected, without any intermediary devices. The term "coupled" means either a direct electrical, mechanical, or magnetic connection between the things that are connected or an indirect connection through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The terms "substantially," "close," "approximately," "near," and "about" generally refer to being within +/−10% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking, or in any other manner.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

Figure 2:
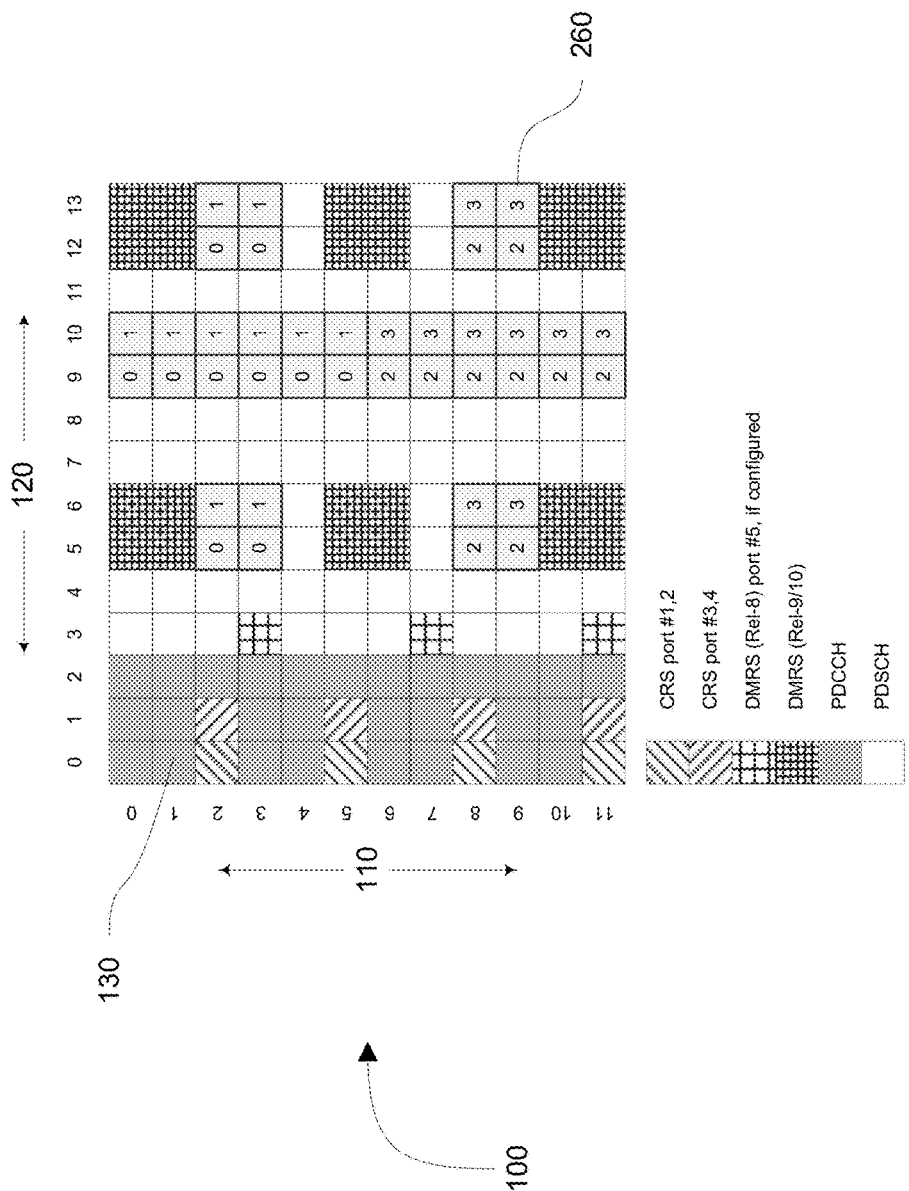
Figure 3:
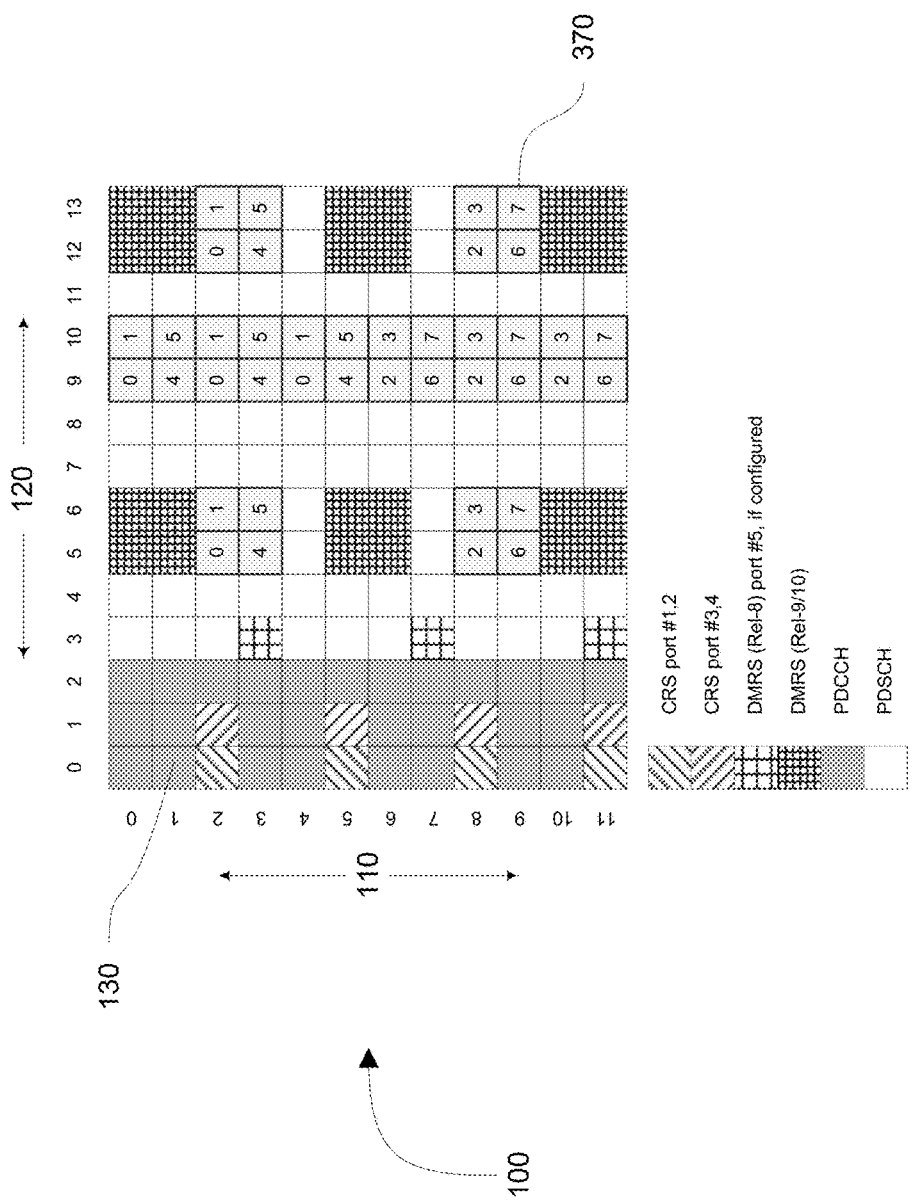

FIGS. 1-3 illustrate embodiments of CSI-RS antenna port allocations within downlink RBs (Resource Blocks), detailing which REs (Resource Elements) within the subframe are associated with which CSI-RS antenna ports. As depicted in FIG. 1, a downlink resource block 100 in accordance with Release 10 of the 3GPP specification is composed of a plurality of subcarriers 110 in the frequency domain and a plurality of OFDM (Orthogonal Frequency-Division Multiplexing) symbols 120 in the time domain. For each subcarrier k and each OFDM symbol l, resource block 100 has a resource element 130.

As shown, for each resource element 130 of downlink resource block 100 (i.e., for each subcarrier and OFDM symbol combination k & l), a particular type of RE is defined. For example, resource element 130 at subcarrier 0 & OFDM symbol 0 of resource block 100 is defined to be a PDCCH (Physical Downlink Control Channel) symbol, as are most of the other resource elements 130 of OFDM symbols 0 through 2. Meanwhile, resource elements 130 at subcarriers 2, 5, 8, and 11 & OFDM symbols 0 and 1 are defined to be CRS (Cell-Specific Reference Symbols) symbols for various ports; resource elements 130 at subcarriers 3, 7, and 11 & OFDM symbol 3 are defined to be DMRS (Demodulation Reference Symbols) symbols in accordance with Release 8; and resource elements 130 at subcarriers 0-1, 5-6, and 10-11 & OFDM symbols 5-6 and 12-13 are defined to be DMRS in accordance with Release-9 and Release-10. Many of the remaining resource elements 130 are defined to be PDSCH (Physical Downlink Shared Channel) symbols.

Some resource elements 130 are defined to be CSI-RS symbols. More specifically, resource elements at all subcarriers & OFDM symbols 9-10, as well as resource elements at subcarriers 2-3 and 8-9 & OFDM symbols 5-6 and 12-13, are defined to be CSI-RS symbols. FIG. 1 depicts a plurality of CSI-RS resource elements 150 for those combinations of subcarriers 110 & OFDM symbols 120 which are defined to be CSI-RS symbols.

Each CSI-RS resource element 150 is enumerated 0 or 1, and corresponds with an antenna port 15 or 16 of the eNB from which resource block 100 is transmitted. Similarly, FIG. 2 depicts a plurality of CSI-RS resource elements 260 enumerated 0 through 3 and corresponding with antenna ports 15 through 18 of the transmitting eNB, and FIG. 3 depicts a plurality of CSI-RS resource elements 370 enumerated 0 through 7 and corresponding with antenna ports 15 through 22 of the transmitting eNB.

FIG. 1 depicts CSI-RS resource elements 150 with 1-port or 2-port antennas, FIG. 2 depicts CSI-RS resource elements 260 associated with 4-port antennas, and FIG. 3 depicts CSI-RS resource elements 370 associated with 8-port antennas. The eNB can accordingly transmit CSI-RS symbols to a UE for wireless communication channels associated with 1 eNB antenna port, 2 eNB antenna ports, 4 eNB antenna ports, or 8 eNB antenna ports.

Figure 4:
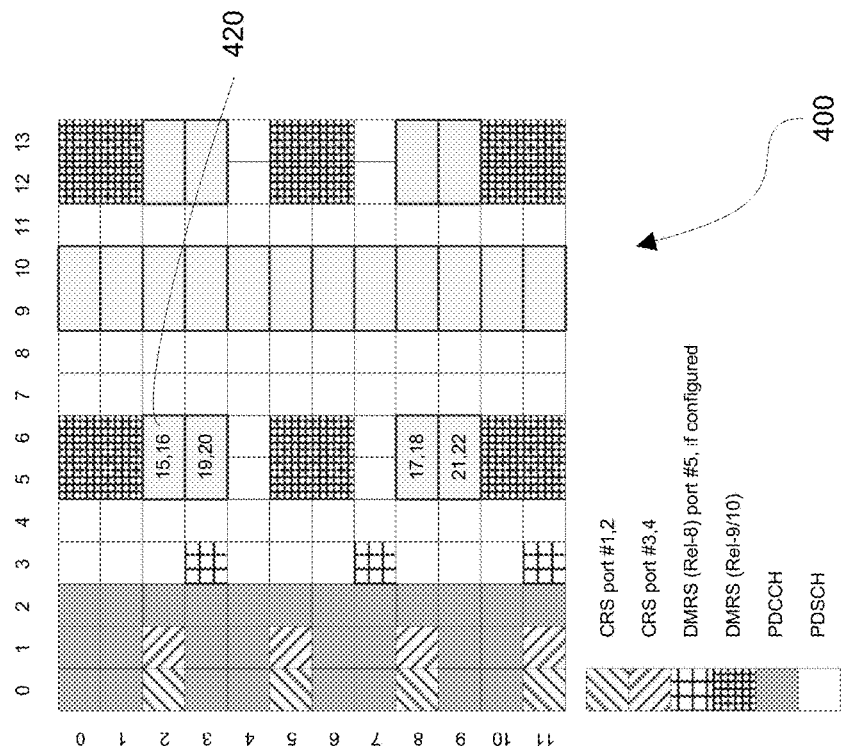
FIGS. 4-6 illustrate embodiments of eNB antenna and antenna port configurations, along with corresponding CSI-RS antenna port allocations.
Figure 4:
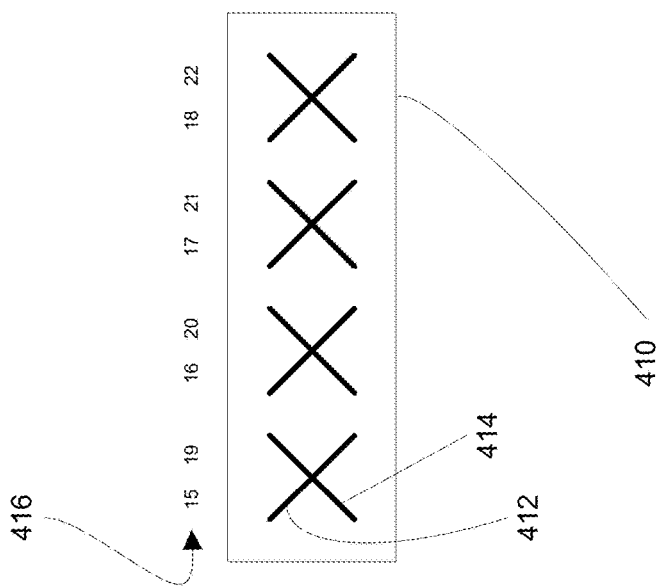
Figure 5:
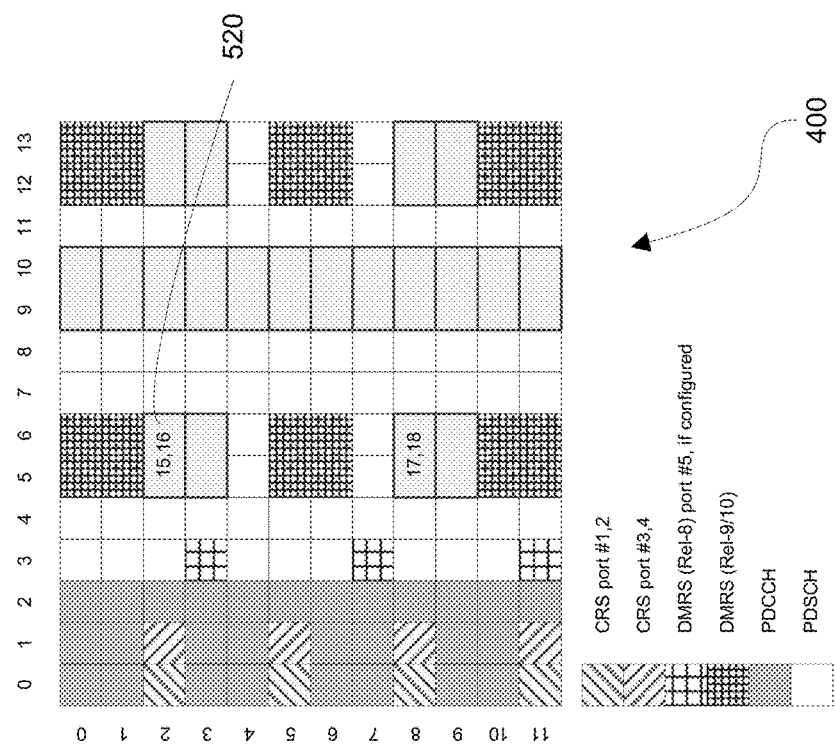
Figure 5:
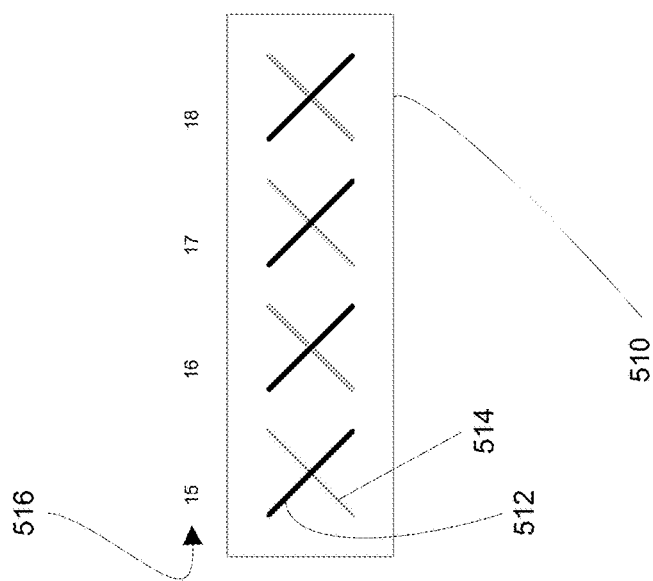
Figure 6:
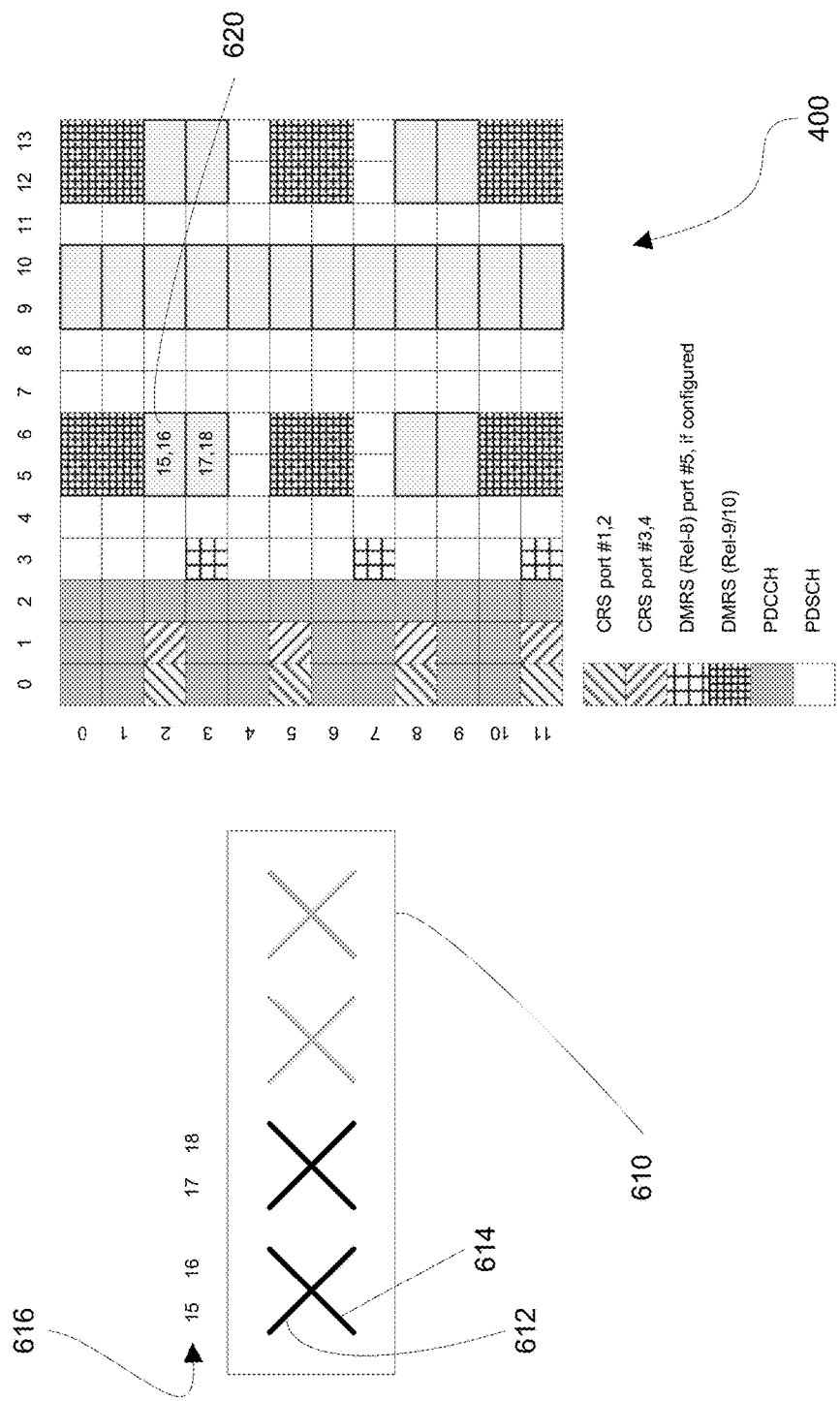

Antenna ports are logical constructs, as opposed to the physical antennas of an eNB or UE. Accordingly, an ordered set of antenna ports may correspond to a set of eNB antennas in a variety of ways. FIGS. 4-6 illustrate embodiments of eNB antenna and antenna port configurations, along with corresponding CSI-RS antenna port allocations. (CSI reference signals may be transmitted on 1-port, 2-port, 4-port, and 8-port antennas using antenna ports numbered 15 through 22; accordingly, where FIGS. 1-3 number the associated resource elements bearing CSI-RS symbols from 0 to 7, the associated eNB antenna ports in FIGS. 4-6 are numbered from 15 through 22. The numbering of eNB from 15 through 22 reflects the numbering of CSI-RS configurations, which will be discussed further below.)

FIG. 4, for example, depicts an eNB antenna configuration 410 and corresponding antenna port configuration 416 for an 8-port eNB antenna. Antenna configuration 410 includes a plurality of first antennas 412 having a first polarization and a plurality of second antennas 414 having a second polarization, where the second polarization is orthogonal to the first polarization. First antennas 412 and second antennas 414 are mapped to various eNB antenna ports in accordance with an antenna port configuration 416, which shows that eNB antenna ports 15-18 correspond to first antennas 412 and eNB antenna ports 19-22 correspond to second antennas 414. Accordingly, the antennas corresponding to eNB antenna ports 15-18 have a polarization orthogonal to the antennas corresponding to eNB antenna ports 19-22. Corresponding resource block 400 depicts RE pairs 420 bearing CSI-RS symbols that are associated with each eNB antenna port (each RE pair being two adjacent OFDM symbols on one subframe).

In FIG. 4, all antennas ports associated with the 8-antenna channel correspond to RE pairs 420 bearing CSI-RS symbols. Individual RE pairs 420 correspond to antennas of the same polarization. As a result, if used in isolation, RE pairs 420 will not allow for CSI-RS measurement of orthogonally-polarized pairs of antennas. However, since CSI-RS for the 8-antenna channel span antenna ports 15-22, and since the eNB antennas corresponding to antenna ports 15-18 and antenna ports 19-22 are orthogonally polarized, RE pairs 420 bearing CSI-RS symbols will allow for CSI-RS measurement of orthogonally-polarized pairs of antennas within the 8-antenna channel. This may be advantageous, since channel state information measurements of CSI-RS symbols transmitted by orthogonally-polarized antennas may lead to better channel performance.

In contrast, FIG. 5 depicts an eNB antenna configuration 510 and corresponding antenna port configuration 516 for a 4-port eNB antenna. Unlike antenna configuration 410, however, antenna configuration 510 only includes a plurality of first antennas 512 having a first polarization, and no second antennas 514 having a second polarization orthogonal to the first polarization. First antennas 512 are mapped to various antenna ports in accordance with an antenna port configuration 516. Based upon codebook design principles, the antenna ports of antenna port configuration 510 are first mapped to antennas of one polarization and then to antennas of another polarization—which in this case means only antennas of one polarization. Corresponding resource block 400 depicts RE pairs 520 bearing CSI-RS symbols that are associated with each eNB antenna port.

Since antenna ports 15-18 are only mapped to first antennas 512, the antenna ports corresponding to RE pairs 520 bearing CSI-RS symbols will not allow for CSI-RS measurement of orthogonally-polarized pairs of antennas for the 4-antenna channel. This may be disadvantageous, since channel state information measurements of CSI-RS symbols transmitted by antennas that are not orthogonally polarized may lead to suboptimal channel performance.

The embodiment depicted in FIG. 6 has an eNB antenna configuration 610 and corresponding antenna port configuration 616 for an alternate 4-port eNB antenna. Here, antenna configuration 610 includes two first antennas 612 having a first polarization and two second antennas 614 having a second polarization orthogonal to the first polarization. Since antenna ports 15-18 are mapped to both first antennas 612 and orthogonally-polarized second antennas 614, and since CSI-RS symbols transmitted by these antennas will be used for channel state information measurements, this embodiment may advantageously lead to better performance of the wireless communication channel associated with the 4-port eNB antenna.

However, the antenna ports associated with RE pairs 620 in corresponding resource block 400 have port assignments that are inconsistent with the CSI-RS antenna port assignments for 4-port antennas in FIG. 2. Based on FIGS. 4-6, a new, more flexible CSI-RS protocol capable of supporting a more flexible assignment of antenna ports may advantageously facilitate the establishment of higher quality wireless communication channels.

Figure 7:
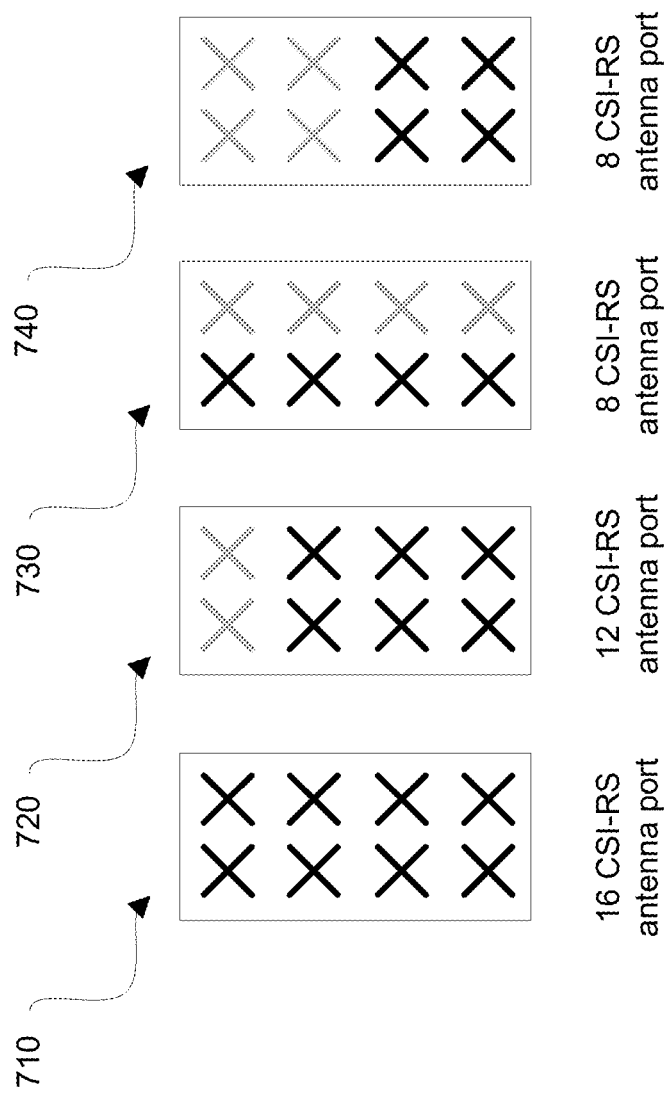
FIG. 7 illustrates a variety of embodiments of antenna configurations.

A new, more flexible CSI-RS protocol may also advantageously accommodate assignment of more suitable eNB antenna resources to wireless communication channels formed with specific UEs. FIG. 7 illustrates a variety of embodiments of antenna configurations. Antenna configuration 710 is a 16-antenna array for an eNB, in which all 16 antennas are mapped to antenna ports for one wireless communication channel. In contrast, in antenna configuration 720, only 12 antennas of the 16-antenna array are mapped to antenna ports for a wireless communication channel. Antenna configurations 730 and 740 show two different embodiments in which 8 antennas of the 16-antenna array are mapped to antenna ports for a wireless communication channel. More particularly, in antenna configuration 730, 8 antennas of one column of the 16-antenna array are mapped to 8 antenna ports for a wireless communication channel, whereas in antenna configuration 740, 4 antennas from each of two columns are mapped to a total of 8 antenna ports for a wireless communication channel. A new, more flexible CSI-RS protocol may facilitate the assignment of the remaining antennas to one or more additional wireless communication channels, based upon the needs of the eNB.

Figure 8:
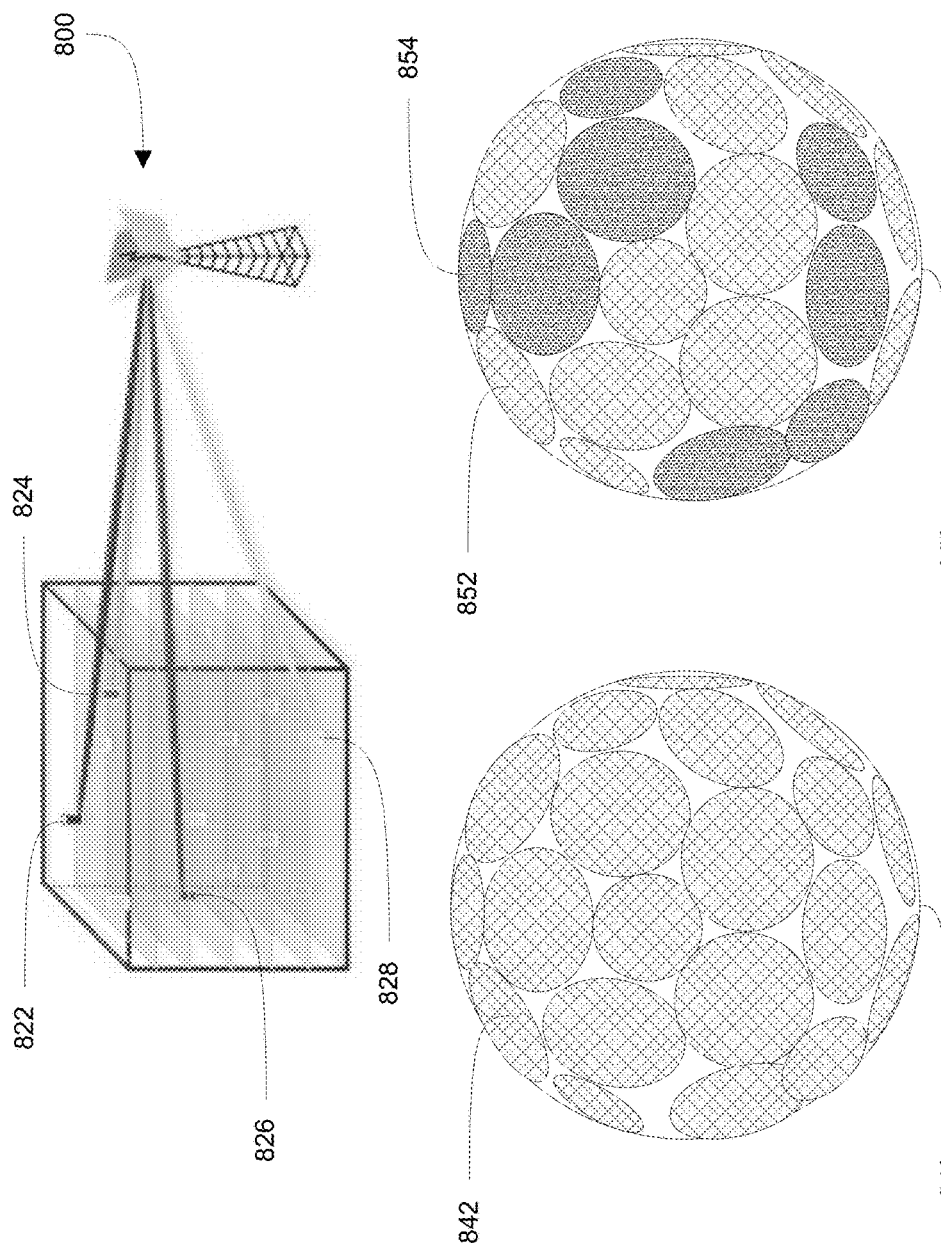
FIG. 8 illustrates an embodiment of an eNB employing FD-MIMO beamforming to communicate with a plurality of UEs, as well as eNB antenna pairs that are generally available for transmission in general and eNB antenna pairs that are available to transmit to a specific UE.

A new, more flexible CSI-RS protocol may also advantageously support FD-MIMO, which may require adaptation in both azimuth and elevation. FIG. 8 illustrates an embodiment of an eNB employing FD-MIMO beamforming to communicate with a plurality of UEs, as well as eNB antenna pairs that are generally available for transmission in general and eNB antenna pairs that are available to transmit to a specific UE. An eNB 800 is depicted at the top of FIG. 8 as having established wireless communications channels with a UE 822, a UE 824, a UE 826, and a UE 828, which have differing azimuth and elevation relative to eNB 800.

At the bottom of FIG. 8, beam diagram 840 depicts various antenna pairs 842 that are available for transmission in general, i.e., that are available for beamforming by eNB 800. Antenna pairs 842 may accordingly be used as portions of one or more 1-port, 2-port, 4-port, or 8-port, or 16-port antennas. Similarly, beam diagram 850 depicts various antenna pairs 852 that are available for transmission in general, and also depicts various antenna pairs 854 that are not only available for transmission in general but are more promising for eNB 800 to use in forming a wireless communications channel with a specific UE, such as UE 822, by creating a beamformed, FD-MIMO downlink. More particularly, antenna pairs 854 may be more promising in forming a wireless communications channel with UE 822 based upon the azimuth and elevation of UE 822 relative to eNB 800. Antenna pairs 854 may accordingly be used to form a 1-port, 2-port, 4-port, 8-port, or 16-port antenna for eNB 800 to use in communicating with UE 822.

Figure 9:
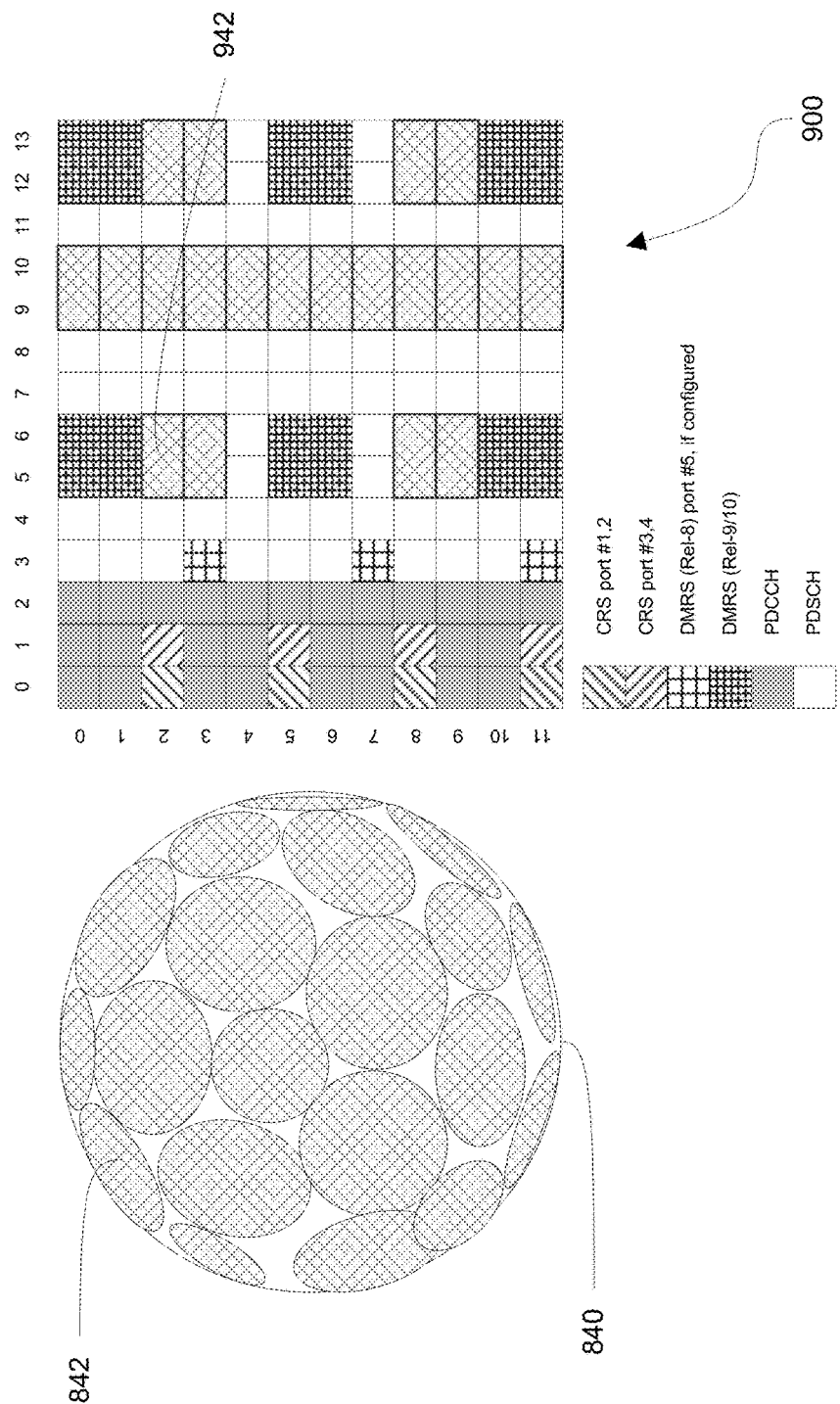
FIGS. 9-10 illustrate embodiments of eNB antenna pairs that are available for transmission in general and eNB antenna pairs that are available to transmit to a specific UE, along with corresponding CSI-RS antenna ports.
Figure 10:
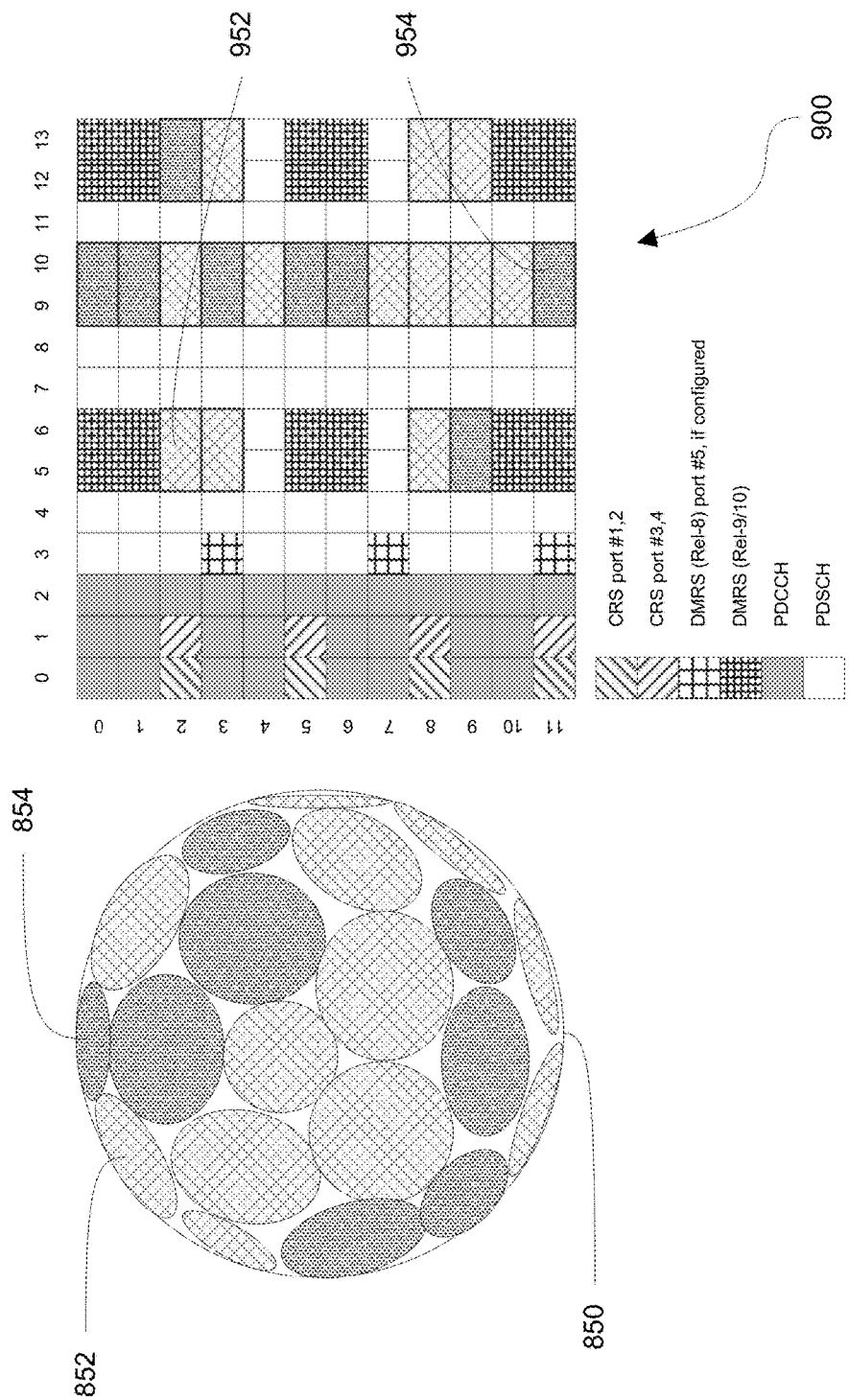

FIGS. 9-10 illustrate embodiments of eNB antenna pairs that are available for transmission in general and eNB antenna pairs that are available to transmit to a specific UE, along with corresponding CSI-RS antenna ports. FIG. 9 shows beam diagram 840 and antenna pairs 842 that are available for transmission in general, while corresponding resource block 900 includes RE pairs 942 that are available to transmit CSI-RS symbols for antenna pairs 842. In FIG. 10, beam diagram 850 shows antenna pairs 852 that are available for transmission in general, and also shows antenna pairs 854 that may be more optimal for use in forming a wireless communications channel with UE 822. Corresponding resource block 900 includes RE pairs 952 that are available to transmit CSI-RS symbols for antenna pairs 852, of which RE pairs 954 correspond to antenna pairs 854. A new, more flexible CSI-RS protocol may advantageously facilitate the use of antenna pairs which may be more optimal for supporting FD-MIMO.

A new, more flexible CSI-RS protocol may accordingly support an ever-increasing number of ports. A new protocol may also support a more flexible assignment of antenna ports, which may lead to more optimal channel performance, and may accommodate assignment of more suitable eNB antenna resources to wireless communication channels formed with specific UEs.

Figure 11:
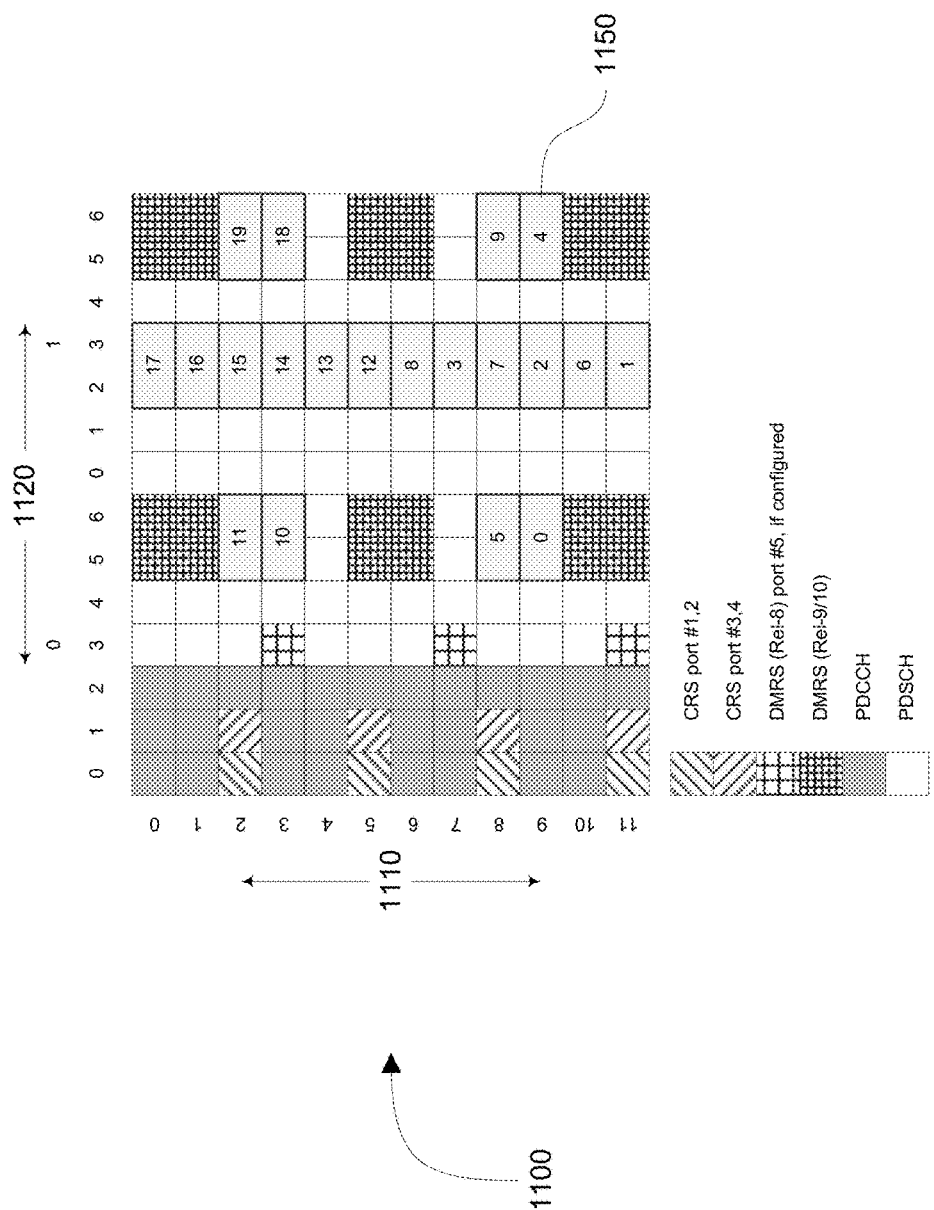
FIGS. 11-13 illustrate embodiments of CSI-RS groups for use in configuring UE antennas.
Figure 12:
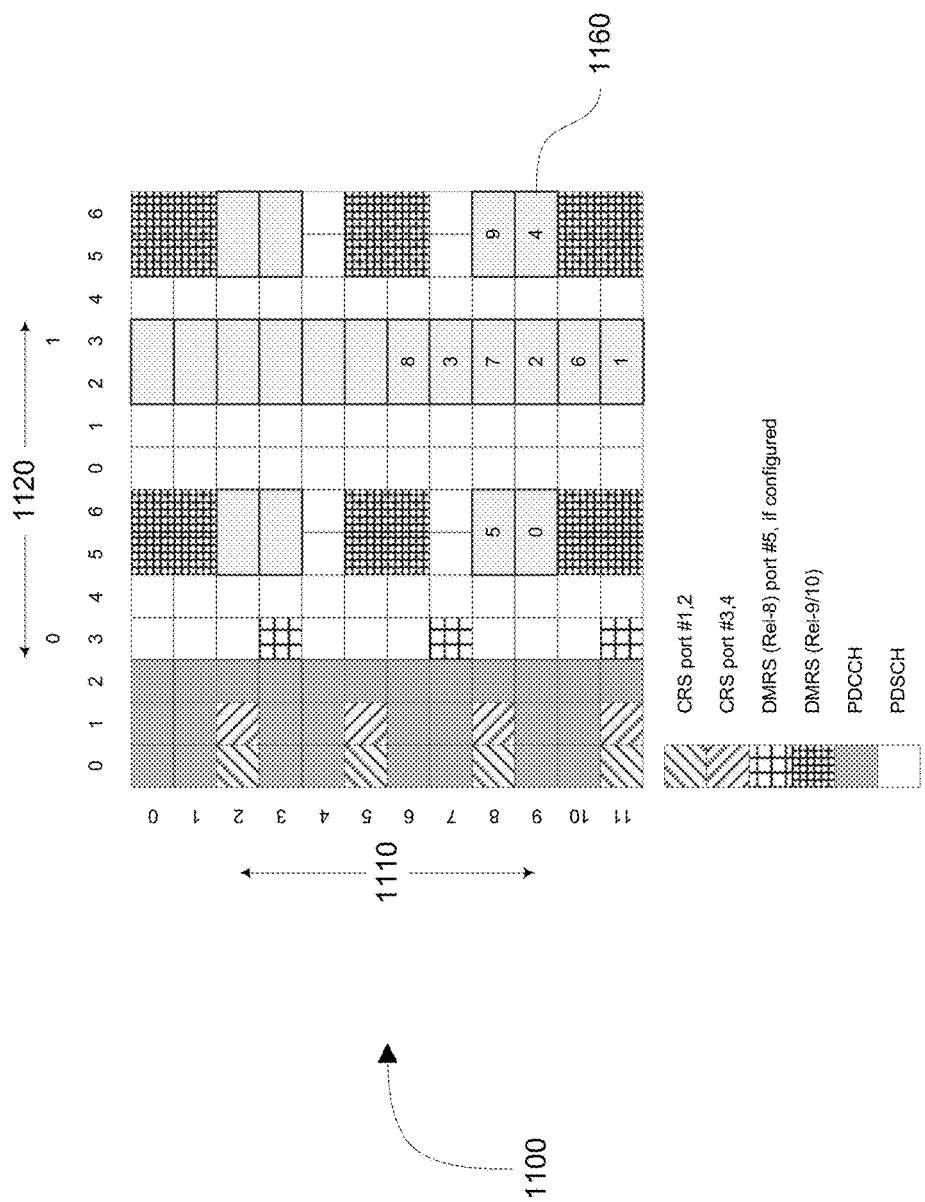
Figure 13:
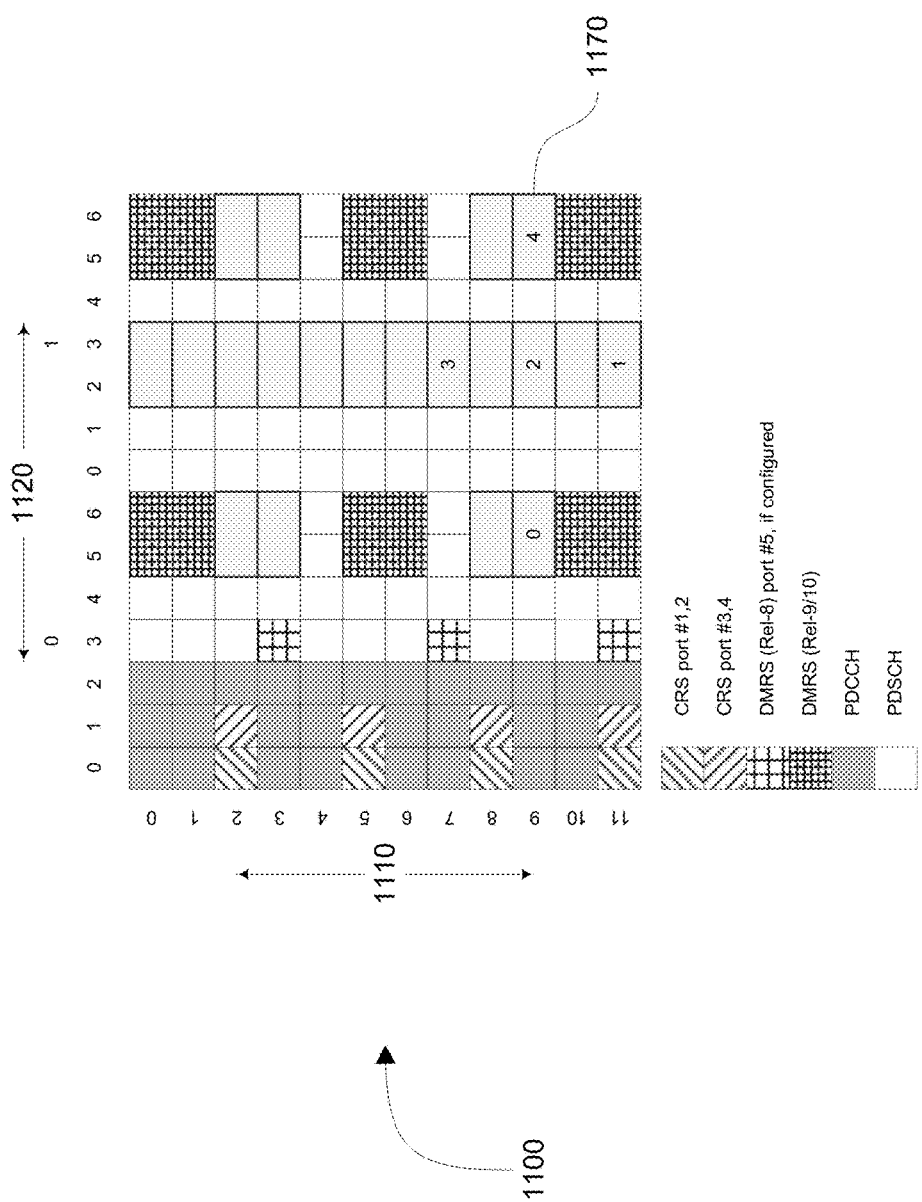

FIGS. 11-13 illustrate embodiments of CSI-RS groups for use in configuring UE antennas. In a new, more flexible CSI-RS protocol, the CSI-RS groups correspond with CSI configurations enumerated in 3GPP TS 36.211 (V10.7.0). Section 6.10.5 of TS 36.211 discusses "CSI reference signals." Section 6.10.5.2 therein covers "Mapping to resource elements," and ultimately provides a table that maps between CSI reference signal configurations and resource elements of a resource block. Section 6.10.5.2 begins by stating:

In subframes configured for CSI reference signal transmission, the reference signal sequence $r_{l,n_s}(m)$ shall be mapped to complex-valued modulation symbols $a_{k,l}^{(p)}$ used as reference symbols on antenna port p according to $$a_{k,l}^{(p)} = w_{l''} \cdot r_{l,n_s}(m')$$

where $$k = k' + 12m + \begin{cases} -0 & \text{for } p \in \{15, 16\}, \text{ normal cyclic prefix} \\ -6 & \text{for } p \in \{17, 18\}, \text{ normal cyclic prefix} \\ -1 & \text{for } p \in \{19, 20\}, \text{ normal cyclic prefix} \\ -7 & \text{for } p \in \{21, 22\}, \text{ normal cyclic prefix} \\ -0 & \text{for } p \in \{15, 16\}, \text{ extended cyclic prefix} \\ -3 & \text{for } p \in \{17, 18\}, \text{ extended cyclic prefix} \\ -6 & \text{for } p \in \{19, 20\}, \text{ extended cyclic prefix} \\ -9 & \text{for } p \in \{21, 22\}, \text{ extended cyclic prefix} \end{cases}$$

-continued $$m = 0, 1, \ldots, N_{RB}^{DL} - 1$$

$$m' = m + \left\lfloor \frac{N_{RB}^{max,DL} - N_{RB}^{DL}}{2} \right\rfloor$$

The quantity (k',l') and the necessary conditions on $n_s$ are given by Tables 6.10.5.2-1 and 6.10.5.2-2 for normal and extended cyclic prefix, respectively.

Section 6.10.5.2 then presents Table 6.10.5.2-1, which shows a mapping between CSI reference signal configurations and resource elements of a resource block. In the table, k' corresponds with a subcarrier, l' corresponds with an OFDM symbol, and $n_s$ mod 2 corresponds with the slot, i.e., whether the OFDM symbol is in the lower half or upper half of a 14-symbol sub-frame. Table 6.10.5.2-1 is reproduced below as Table 1.

TABLE 1

Mapping from CSI reference signal configurations (k', l') for normal cyclic prefix

| | | Number of CSI reference signals configured | | | | | |
|---|---|---|---|---|---|---|---|
| | | 1 or 2 | | 4 | | 8 | |
| CSI reference signal configuration | | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

-continued $$l = l' + \begin{cases} l'' & \text{CSI reference signal configurations 0-19, normal cyclic prefix} \\ 2l'' & \text{CSI reference signal configurations 20-31, normal cyclic prefix} \\ l'' & \text{CSI reference signal configurations 0-27, extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

With reference to FIGS. 11-13, a resource block 1100 extends across twelve subcarriers 1110 in the frequency domain (enumerated as 0-11) and fourteen OFDM symbols in the time domain (enumerated as 0-6 for both slots 0 and 1). Various RE pairs are enumerated to correspond with the various CSI-RS groups for 1-port, 2-port, 4-port, and 8-port antennas, as described in Table 6.10.5.2-1. More specifically, FIG. 11 enumerates RE pairs corresponding to CSI-RS groups for 1-port and 2-port antennas, FIG. 12 enumerates RE pairs corresponding to CSI-RS groups for 4-port antennas, and FIG. 13 enumerates RE pairs corresponding to CSI-RS groups for 8-port antennas.

In the CSI-RS protocol, each of CSI reference signal configurations 0-19 listed in Table 6.10.5.2-1 is mapped to one of CSI-RS groups 1150 in FIG. 11, where k' indicates the subcarrier within subcarriers 1110 of resource block 1100, $n_s$ mod 2 indicates either the lower slot ($n_s$ mod 2=0) or the upper slot ($n_s$ mod 2=1) within the subframe/OFDM symbol 1120 of resource block 1100, and l' indicates the OFDM symbol within the subframe/OFDM symbols. Similarly, each of CSI reference signal configurations 0-9 listed in Table 6.10.5.2-1 is mapped to one of CSI-RS groups 1160 in FIG. 12, and each of CSI reference signal configurations 0-4 listed in Table 6.10.5.2-1 is mapped to one of CSI-RS groups 1170 in FIG. 13.

The CSI-RS groups of FIGS. 11-13 may be used to specify CSI-RS antenna ports that correspond, in aggregate, with an N-port antenna. For example, with reference to FIGS. 6 and 11, the RE pairs 620 associated with antenna ports 15-18 in FIG. 6 correspond with (in order) number 11 and 10 of CSI-RS groups 1150 in FIG. 11. So, CSI configurations 11 and 10 specify, in order, the two RE pairs corresponding with antenna ports 15,16 and 17,18 in FIG. 6.

Accordingly, in the CSI-RS protocol, an eNB may send one or more configuration messages to a UE, and each configuration message may assign to the UE a CSI-RS group that specifies one or more CSI-RS antenna ports. The CSI-RS groups correspond with the CSI-RS configurations enumerated in Table 6.10.5.2-1. That is, each CSI-RS group may specify a 1-port, 2-port, 4-port, or 8-port CSI-RS antenna port. Depending up the number of eNB antennas making up the wireless communications channel between the eNB and the UE, any number of CSI-RS groups, in any order, may be assigned to the UE to correspond with the number of eNB antennas to be aggregated in forming the wireless communications channel.

Figure 14:
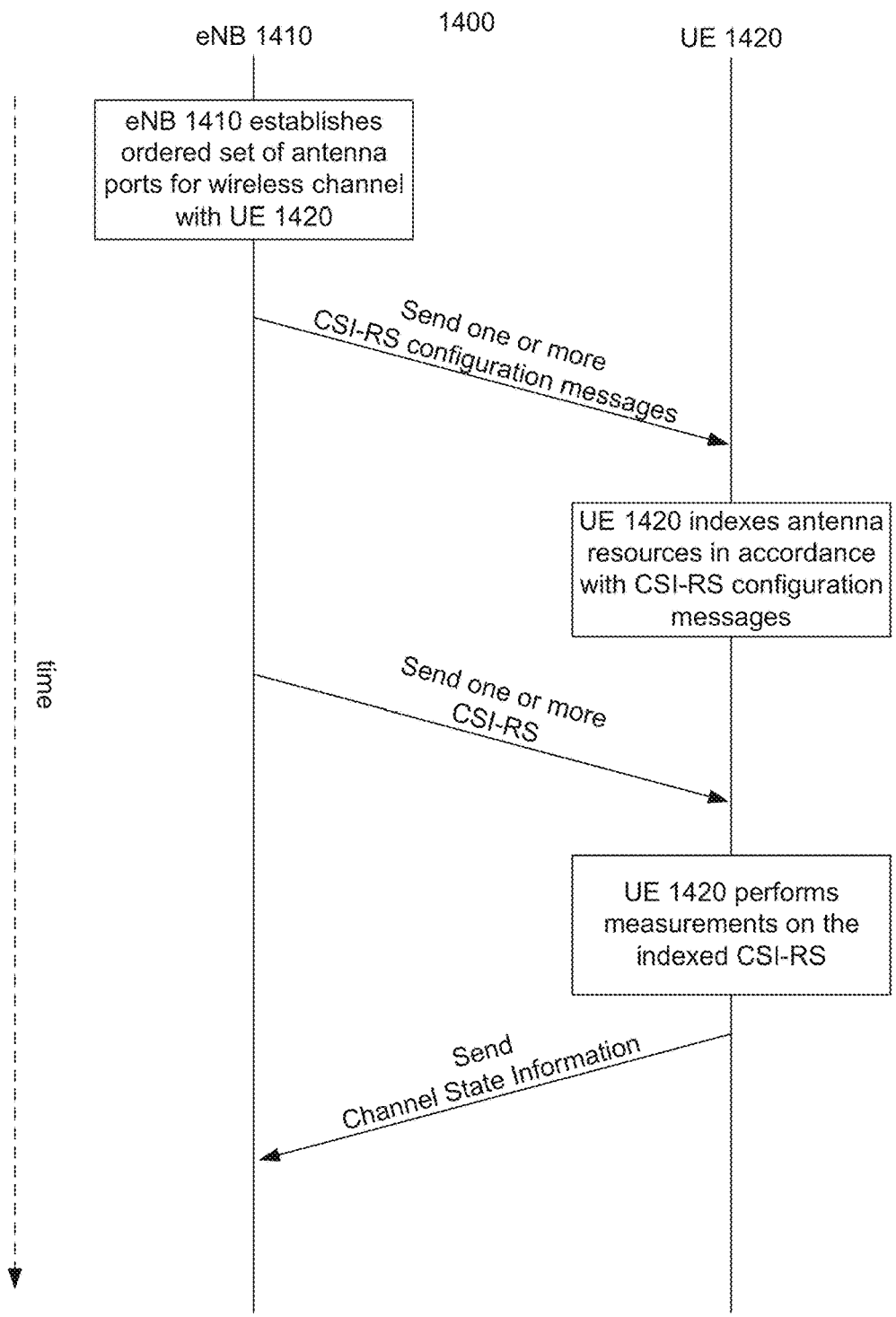
FIG. 14 illustrates an embodiment of a protocol between an eNB and a UE for using CSI-RS groups to configure UE antennas.

FIG. 14 illustrates an embodiment of a protocol between an eNB and a UE for using CSI-RS groups to configure UE antennas. Under CSI-RS protocol 1400, an eNB 1410 first establishes an ordered set of eNB antenna ports to be used for a wireless communications channel with a UE 1420. eNB 1410 then sends one or more CSI-RS configuration messages to UE 1420. Each CSI-RS configuration message assigns one or more CSI-RS groups to U 1420, and each CSI-RS group specifies one or more CSI-RS antenna ports. UE 1420 then indexes an ordered list of CSI-RS antenna ports for at least part of the wireless communication channel, based on the CSI-RS antenna ports specified by the assigned CSI-RS groups. The order of the CSI-RS antenna ports within the ordered list is established by the order in which the CSI-RS configuration messages arrived at UE 1420.

Having configured UE 1420 in this manner, eNB 1410 subsequently sends one or more CSI-RS symbols corresponding with the CSI-RS antenna ports specified by the CSI-RS groups sent to UE 1420. UE 1420 then performs channel state information measurements on the indexed CSI-RS antenna ports. Based on the channel state information measurements, UE 1420 calculates channel state information, which it reports back to eNB 1410.

Figure 15:
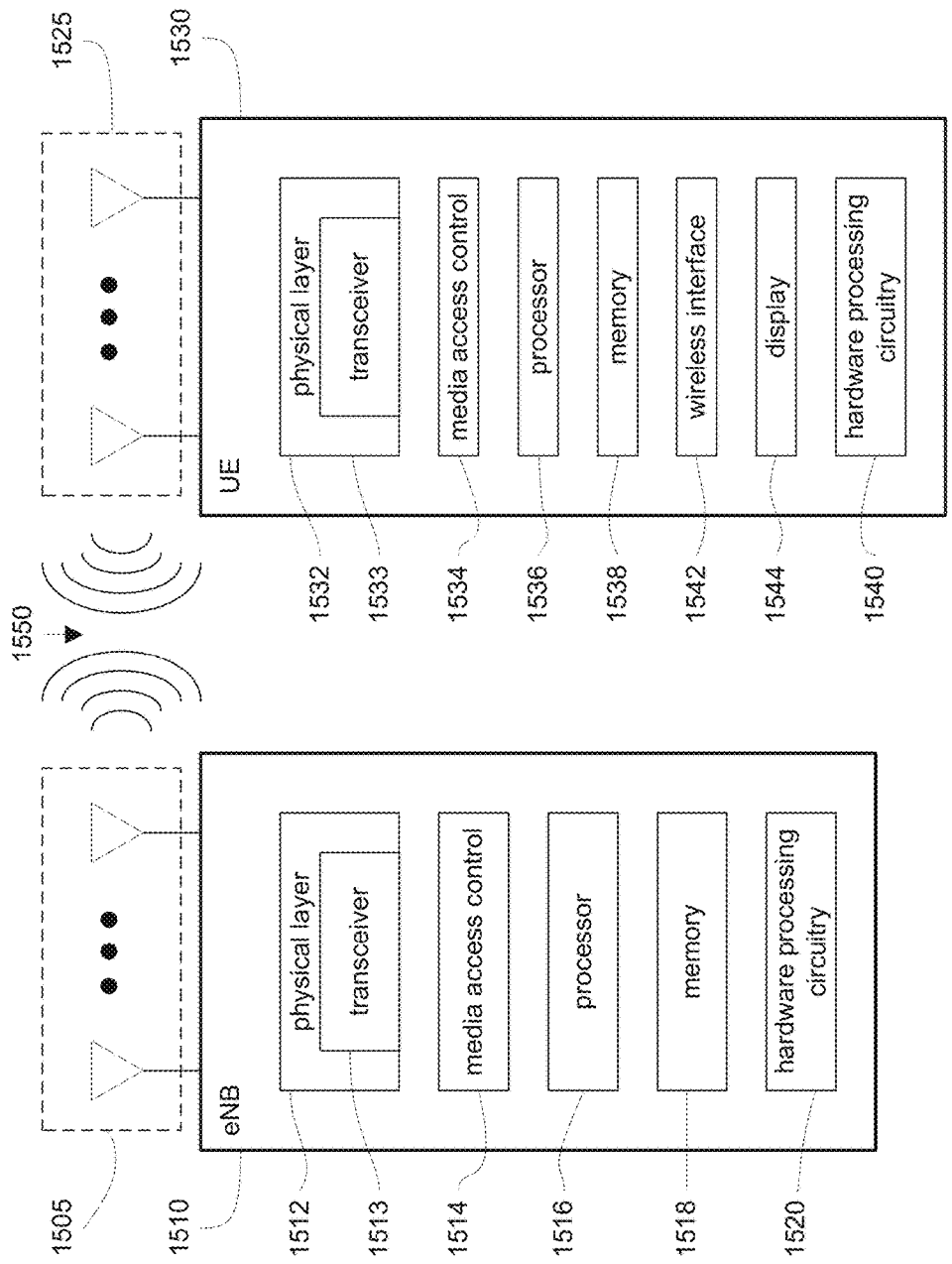
FIG. 15 illustrates an embodiment of an eNB and an embodiment of a UE.

FIG. 15 illustrates an embodiment of an eNB and an embodiment of a UE. More specifically, FIG. 15 includes block diagrams of an eNB 1510 and a UE 1530 which are operable to co-exist with each other and other elements of an LTE network. High-level, simplified architectures of eNB 1510 and UE 1530 are described so as not to obscure the embodiments. It should be noted that in some embodiments, eNB 1510 may be a stationary non-mobile device.

eNB 1510 is coupled to one or more antennas 1505, and UE 1530 is similarly coupled to one or more antennas 1525. However, in some embodiments, eNB 1510 may incorporate or comprise antennas 1505, and UE 1530 in various embodiments may incorporate or comprise antennas 1525.

In some embodiments, eNB 1510 may include a physical layer circuitry 1512, a MAC (media access control) circuitry 1514, a processor 1516, a memory 1518, and a hardware processing circuitry 1520. A person skilled in the art will appreciate that other components not shown may be used in addition to the components shown to form a complete eNB.

In some embodiments, physical layer circuitry 1512 includes a transceiver 1513 for providing signals to and from UE 1530. Transceiver 1513 provides signals to and from UEs or other devices using one or more antennas 1505. In some embodiments, MAC circuitry 1514 controls access to the wireless medium. Memory 1518 may be, or may include, a storage media/medium such as a magnetic storage media (e.g. magnetic tapes or magnetic disks), an optical storage media (e.g. optical discs), an electronic storage media (e.g. conventional hard disk drives, solid-state disk drives, or flash-memory-based storage media), or any tangible storage media or non-transitory storage media. Hardware processing circuitry 1520 may comprise logic devices or circuitry to perform various operations. In some embodiments, processor 1516 and memory 1518 are arranged to perform the operations of hardware processing circuitry 1520, such as operations described herein with reference to logic devices and circuitry within eNB 1510 and/or hardware processing circuitry 1520.

In some embodiments, antennas 1505 coupled to eNB 1510 may comprise one or more directional or omni-directional antennas, including monopole antennas, dipole antennas, loop antennas, patch antennas, microstrip antennas, coplanar wave antennas, or other types of antennas suitable for transmission of RF signals. In some MIMO (multiple-input and multiple output) embodiments, antennas 1505 are separated to take advantage of spatial diversity.

FIG. 15 also includes a block diagram of a UE 1530. In some embodiments, UE 1530 may include a physical layer circuitry 1532, a MAC circuitry 1534, a processor 1536, a memory 1538, a hardware processing circuitry 1540, a wireless interface 1542, and a display 1544. A person skilled in the art would appreciate that other components not shown may be used in addition to the components shown to form a complete UE.

In some embodiments, physical layer circuitry 1532 includes a transceiver 1533 for providing signals to and from eNB 1510 (as well as other eNBs). Transceiver 1533 provides signals to and from eNBs or other devices using one or more antennas 1525. In some embodiments, MAC circuitry 1534 controls access to the wireless medium. Memory 1518 may be, or may include, a storage media/medium such as a magnetic storage media (e.g. magnetic tapes or magnetic disks), an optical storage media (e.g. optical discs), an electronic storage media (e.g. conventional hard disk drives, solid-state disk drives, or flash-memory-based storage media), or any tangible storage media or non-transitory storage media. Wireless interface 1542 is arranged to allow the processor to communicate with another device. Display 1544 provides a visual and/or tactile display for a user to interact with UE 1530, such as a touch-screen display. Hardware processing circuitry 1540 may comprise logic devices or circuitry to perform various operations. In some embodiments, processor 1536 and memory 1538 may be arranged to perform the operations of hardware processing circuitry 1540, such as operations described herein with reference to logic devices and circuitry within UE 1530 and/or hardware processing circuitry 1540.

In some embodiments, antennas 1525 coupled to UE 1530 may comprise one or more directional or omnidirectional antennas, including monopole antennas, dipole antennas, loop antennas, patch antennas, microstrip antennas, coplanar wave antennas, or other types of antennas suitable for transmission of Radio Frequency (RF) signals. In some MIMO embodiments, antennas 1525 are separated to take advantage of spatial diversity.

Elements of eNB 1510 and UE 1530, and elements of other figures having the same names or reference numbers, can operate or function in the manner described with respect to any such figures (although the operation and function of such elements is not limited to such descriptions). For example, FIGS. 8, 14, 16-17, and 20 also depict embodiments of eNBs and/or UEs, and the embodiments described with respect to FIG. 15 and FIGS. 8, 14, and 20 can operate or function in the manner described with respect to any of the figures.

In addition, although eNB 1510 and UE 1530 are each described as having several separate functional elements, one or more of the functional elements may be combined and may be implemented by combinations of software-configured elements and/or other hardware elements. In some embodiments of this disclosure, the functional elements can refer to one or more processes operating on one or more processing elements. Examples of software and/or hardware configured elements include Digital Signal Processors (DSPs), one or more microprocessors, DSPs, Field-Programmable Gate Arrays (FPGAs), Application Specific Integrated Circuits (ASICs), Radio-Frequency Integrated Circuits (RFICs), and so on.

In FIG. 15, eNB 1510 and UE 1530 are operable to communicate with each other on a network, such as a wireless network. More specifically, eNB 1510 and UE 1530 may be in communication with each other over a wireless communication channel 1550, which has both a downlink path from eNB 1510 to UE 1530 and an uplink path from UE 1530 to eNB 1510. eNB 1510 may send CSI-RS configuration messages, as well as the CSI-RS symbols themselves, over the downlink to UE 1530 over wireless communications channel 1550. In turn, UE 1530 may transmit calculated channel state information back to eNB 1510 over wireless communications channel 1550.

Figure 16:
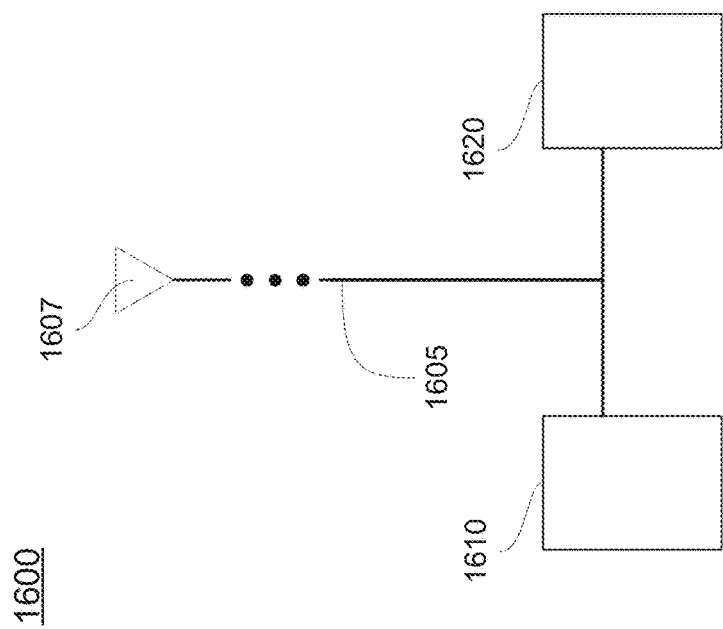
FIG. 16 illustrates an embodiment of a hardware processing circuitry for an eNB.

FIG. 16 illustrates an embodiment of a hardware processing circuitry for an eNB. With reference to FIG. 15, eNB 1510 (or various elements or components therein, or combinations of elements or components therein) may include a hardware processing circuitry 1600. Hardware processing circuitry 1600 may comprise logic devices or circuitry to perform various operations. In some embodiments, processor 1516 and memory 1518 may be arranged to perform the operations of hardware processing circuitry 1600, such as operations described herein with reference to devices and circuitry within hardware processing circuitry 1600. For example, one or more circuits of hardware processing circuitry 1600 may be implemented by combinations of software-configured elements and/or other hardware elements.

In FIG. 16, and also with reference to various aspects of FIGS. 11-15, in some embodiments, hardware processing circuitry 1600 may comprise a set of antennas 1607, and may also comprise an ordered set of antenna ports 1605 for at least part of a channel associated with a set of receiving antennas of the UE, such as eNB antenna ports associated with any of antennas 1607, or antennas 1505, or any other antennas that contribute to the formation of wireless communication channel 1550. Hardware processing circuitry 1600 may also comprise a first circuitry 1610 operable to compose messages to UE 1530, and a second circuitry 1620 operable to establish CSI-RS group assignments. First circuitry 1610 and second circuitry 1620 may be coupled to antenna ports 1605.

Some messages composed by first circuitry 1610 may be configuration messages that assign to UE 1530 a CSI-RS group specifying one or more CSI-RS antenna ports. In some embodiments, first circuitry 1610 may compose a first CSI-RS configuration message assigning a first CSI-RS group to UE 1530, and may compose a second CSI-RS configuration message assigning a second CSI-RS group to UE 1530. In turn, the first assigned CSI-RS group and the second assigned CSI-RS group may each specify one or more CSI-RS antenna ports transmitted on various downlink sub-frames.

First circuitry 1610 may be operable to compose more than two CSI-RS configuration messages, and can compose any number of additional CSI-RS configuration messages assigning additional CSI-RS groups to UE 1530 in various embodiments. In some embodiments, first circuitry 1610 may be operable to compose a single CSI-RS configuration message assigning the first CSI-RS group, the second CSI-RS group, and any additional CSI-RS groups (as will be discussed in greater detail below).

The specific number and type of CSI-RS group assignments may be established by second circuitry 1620, and may include any number of CSI-RS groups that in aggregate correspond with ordered set of antenna ports 1605. Second circuitry 1620 may accordingly establish any number of 1-port or 2-port CSI-RS group assignments, any number of 4-port CSI-RS group assignments, and/or any number of 8-port CSI-RS group assignments, in any order, to correspond with ordered set of antenna ports 1605. When aggregated, the CSI-RS antenna ports specified by the assigned CSI-RS groups may accordingly be an ordered list of CSI-RS antenna ports corresponding with ordered set of antenna ports 1605.

So, in some embodiments, the ordered list of CSI-RS antenna ports may include one or more antenna ports specified by a first CSI-RS group assigned by a first CSI-RS configuration message, and one or more antenna ports specified by a second CSI-RS group assigned by a second CSI-RS configuration message. The ordered list of CSI-RS antenna ports may also, in various embodiments, include one or more antenna ports specified by any number of additional CSI-RS configuration messages.

The CSI-RS antenna ports specified by the assigned CSI-RS groups may be related to ordered set of antenna ports 1605 in a variety of ways. In some embodiments, the second circuitry may be operable to establish one or more antenna ports specified by a first assigned CSI-RS group as being associated with a first portion of ordered set of antenna ports 1605, and to establish one or more antenna ports specified by a second assigned CSI-RS group as being associated with a second portion of ordered set of antenna ports 1605, wherein the second portion follows the first portion in ordered set of antenna ports 1605. In other words, all CSI-RS antenna ports specified by a first assigned CSI-RS group, followed by all CSI-RS antenna ports specified by a second assigned CSI-RS group (and followed by all CSI-RS antenna ports specified by any additional assigned CSI-RS groups) may correspond with at least part of ordered set of antenna ports 1605.

In other embodiments, second circuitry 1620 may be operable (1) to establish a first CSI-RS antenna port specified by the first assigned CSI-RS group and a first CSI-RS antenna port specified by the second assigned CSI-RS group as being associated with a first portion of ordered set of antenna ports 1605, and (2) to establish a second CSI-RS antenna port specified by the first assigned CSI-RS group and a second CSI-RS antenna port specified by the second assigned CSI-RS group as being associated with a second portion of ordered set of antenna ports 1605, the second portion following the first portion in ordered set of antenna ports 1605. Put another way, the CSI-RS antenna ports specified by a first assigned CSI-RS group, interleaved with CSI-RS antenna ports specified by a second assigned CSI-RS group (and interleaved with CSI-RS antenna ports specified by any additional assigned CSI-RS groups) may correspond with at least part of ordered set of antenna ports 1605.

In still further embodiments, a first assigned CSI-RS group and a second assigned CSI-RS group may be contained in one message to UE 1530 having an information element (IE) that specifies each CSI-RS group as at least one asserted bit in an array of bits. In other words, a first assigned CSI-RS group and a second assigned CSI-RS group (along with any additional assigned CSI-RS groups) may be contained in one CSI-RS configuration message from eNB 1510 to UE 1530. Such a message may include a set of bits, each of which may correspond to at least one 1-port, 2-port, 4-port, or 8-port CSI reference signal configuration as indicated by, for example, Table 6.10.5.2-1.

The CSI-RS protocol discussed herein may advantageously permit the establishment of more optimal wireless communication channels between eNB 1510 and UE 1530. For example, in some embodiments, second circuitry 1620 may establish one or more antenna ports specified by the first assigned CSI-RS group as being associated with a first antenna coupled to eNB 1510, and establish one or more antenna ports specified by the second assigned CSI-RS group as being associated with a second antenna coupled to eNB 1510, the first antenna and the second antenna having orthogonal polarizations. In other words, an antenna of eNB 1510 associated with a CSI-RS antenna port specified by a first assigned CSI-RS group may have a polarization orthogonal to the polarization of an antenna of eNB 1510 associated with a CSI-RS antenna port specified by a second assigned CSI-RS group. Channel state information measurements of the associated CSI-RS symbols may then lead to more optimal channel performance.

Figure 17:
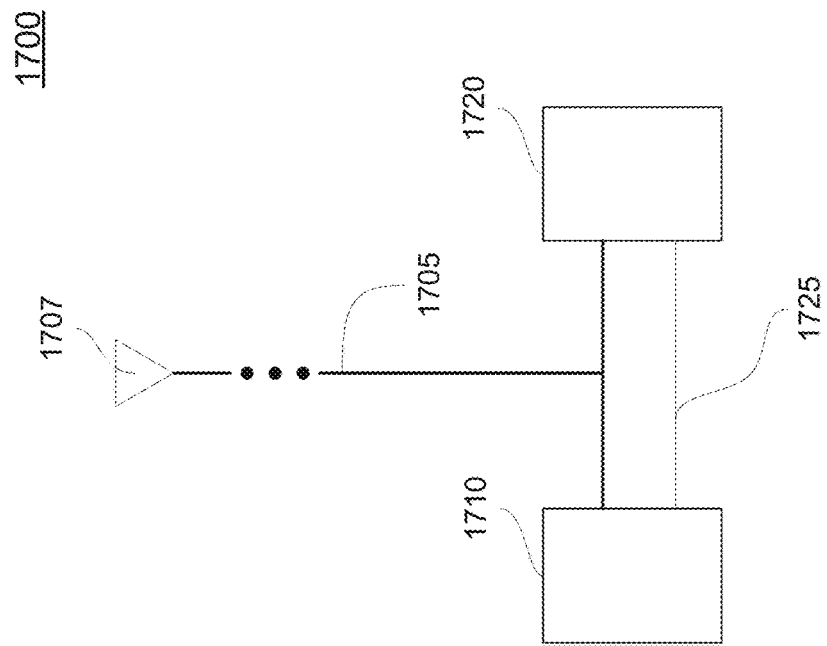
FIG. 17 illustrates an embodiment of a hardware processing circuitry for a UE.

FIG. 17 illustrates an embodiment of a hardware processing circuitry for a UE. With reference to FIG. 15, UE 1530 (or various elements or components therein or combinations of elements or components therein) may include a hardware processing circuitry 1700. Hardware processing circuitry 1700 may comprise logic devices or circuitry to perform various operations. In some embodiments, processor 1536 and memory 1538 may be arranged to perform the operations of hardware processing circuitry 1700, such as operations described herein with reference to devices and circuitry within hardware processing circuitry 1700. For example, one or more circuits of hardware processing circuitry 1700 may be implemented by combinations of software-configured elements and/or other hardware elements.

In FIG. 17, and also with reference to various aspects of FIGS. 11-15, in some embodiments, hardware processing circuitry 1700 may comprise a set of antenna ports 1705, which may be coupled to a set of antennas such as antennas 1707, or antennas 1525, or any other antennas that contribute to the formation of wireless communication channel 1550. Hardware processing circuitry 1700 may also comprise a first circuitry 1710 operable to receive CSI-RS configuration messages from eNB 1510, and a second circuitry 1720 operable to index assigned CSI-RS groups as an ordered list of CSI-RS antenna ports. First circuitry 1710 and second circuitry 1720 may be coupled to antenna ports 1605. In addition, the set of antennas 1707 may be associated with at least part of the ordered list of CSI-RS antenna ports.

Some messages received by first circuitry 1710 may be configuration messages from eNB 1510 that assign to UE 1530 a CSI-RS group specifying one or more CSI-RS antenna ports. In some embodiments, first circuitry 1710 may receive, from eNB 1510, the first CSI-RS configuration message assigning the first CSI-RS group and the second CSI-RS configuration message assigning the second CSI-RS group. First circuitry 1710 may also be operable to receive more than two CSI-RS configuration messages, and in various embodiments may receive any number of additional CSI-RS configuration messages assigning additional CSI-RS groups to UE 1530. Furthermore, in some embodiments, first circuitry 1710 may be operable to receive a single CSI-RS configuration message assigning both the first CSI-RS group and the second CSI-RS group, as well as any additional CSI-RS groups.

After the CSI-RS configuration has been received, second circuitry 1720 may then index the CSI-RS antenna ports specified by the first assigned CSI-RS group and the CSI-RS antenna ports specified by the second assigned CSI-RS as an ordered list of CSI-RS antenna ports for at least part of a channel associated with set of antennas 1707. The indexing done by UE 1530 should thus complement the manner in which the CSI-RS groups were established by second circuitry 1620 of eNB 1510, so that the ordered list of CSI-RS antenna ports of UE 1530 may correspond with the ordered set of antenna ports of eNB 1510.

Second circuitry 1720 may be operable to index the ordered list of CSI-RS antenna ports in a variety of ways. In some embodiments, second circuitry 1720 may be operable to index the ordered list of CSI-RS antenna ports beginning with all of the antenna ports specified by the first assigned CSI-RS group, then all of the antenna ports specified by the second assigned CSI-RS group. That is, second circuitry 1720 may index all CSI-RS antenna ports specified by each assigned CSI-RS group in the order in which they are received.

In other embodiments, second circuitry 1720 may be operable to index the ordered list of CSI-RS antenna ports beginning with (1) a first portion of the CSI-RS antenna ports specified by the first assigned CSI-RS group and a first portion of the CSI-RS antenna ports specified by the second assigned CSI-RS group, followed by (2) a second portion of the CSI-RS antenna ports specified by the first assigned CSI-RS group and a second portion of the CSI-RS antenna ports specified by the second assigned CSI-RS group. In other words, the first CSI-RS antenna port of each assigned CSI-RS group may be indexed, followed by the second CSI-RS antenna port of each assigned CSI-RS group, and so on, through the last CSI-RS antenna port of each assigned CSI-RS group.

In still further embodiments, the first assigned CSI-RS group and the second assigned CSI-RS group (along with any additional assigned CSI-RS groups) may be contained in the same message to UE 1530, which may have an information element (IE) that specifies each CSI-RS group as at least one asserted bit in array of bits. Each bit in the array of bits may in turn correspond to at least one 1-port, 2-port, 4-port, or 8-port CSI reference signal configuration as indicated by, for example, Table 6.10.5.2-1.

After UE 1530 has had an opportunity to index the CSI-RS antenna ports of the various CSI-RS groups into the ordered list of CSI-RS antenna ports, eNB 1510 may transmit the CSI-RS symbols on the CSI-RS antenna ports of the ordered list. Second circuitry 1720 may then be operable to perform channel state information measurements on the ordered list of CSI-RS antenna ports. Based on the above discussion, each CSI-RS antenna port of the ordered list of CSI-RS antenna ports may correspond with a CSI-RS configuration for a 1-port, 2-port, 4-port, or 8-port antenna as defined in 3GPP TS 36.211 (V10.7.0). Furthermore, due to the flexibility of the CSI-RS protocol, the CSI-RS symbols for the ordered list of CSI-RS antenna ports may all be transmitted in the same downlink sub-frame.

After UE 1530 has performed the channel state information measurements, second circuitry 1720 may be operable to calculate channel state information based on the channel state information measurements, and to present the calculated channel state information to first circuitry 1710 via calculation interface 1725. First circuitry 1710 may then be operable to compose a reporting message to eNB 1510 containing the calculated channel state information received via calculation interface 1725. In a corresponding manner, first circuitry 1610 of eNB 1510 may be operable to receive the reporting message from UE 1530 containing the calculated channel state information for the channel, based upon the channel state information measurements on the ordered list of CSI-RS antenna ports. eNB 1510 may then use the channel state information to help manage its antenna resources for better performance.

Figure 18:
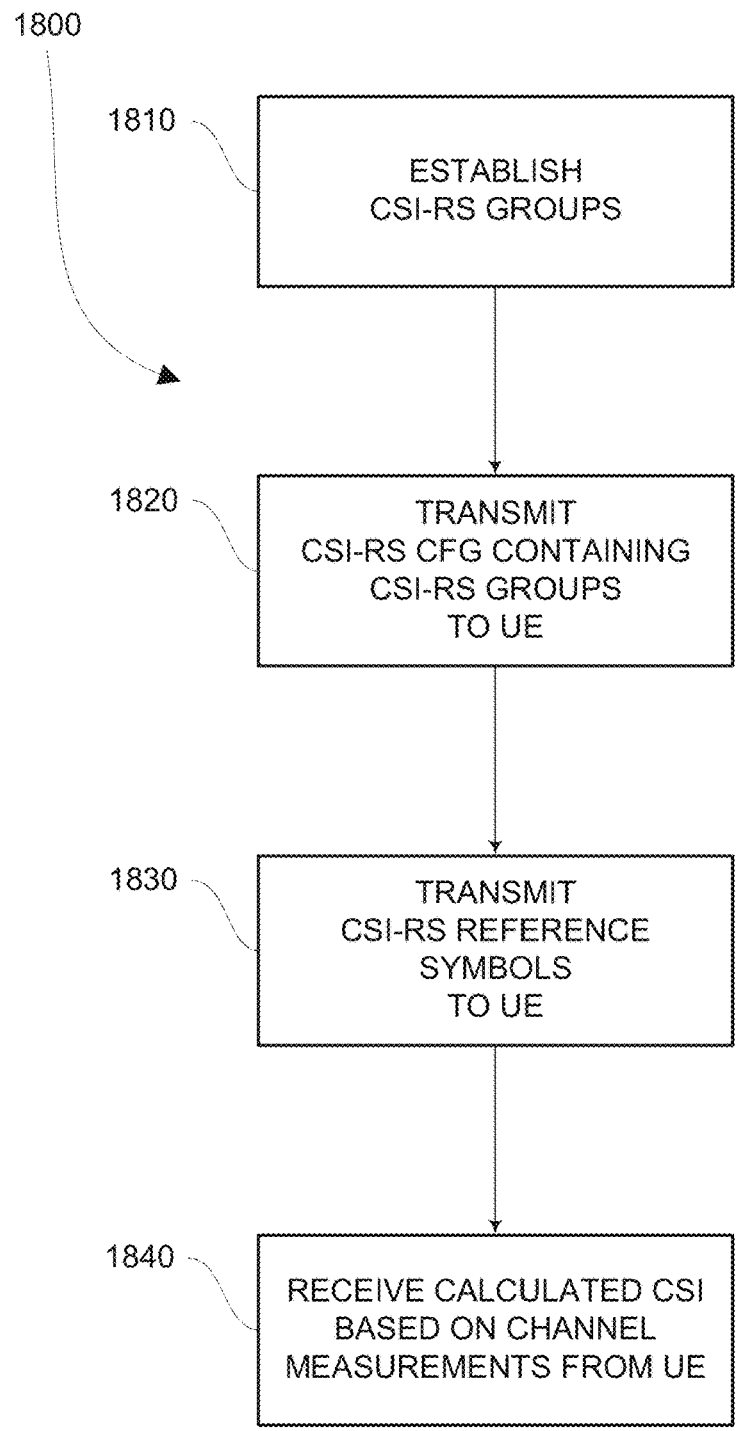
FIGS. 18-19 illustrate embodiments of methods for using CSI-RS groups to configure UE antennas.
Figure 19:
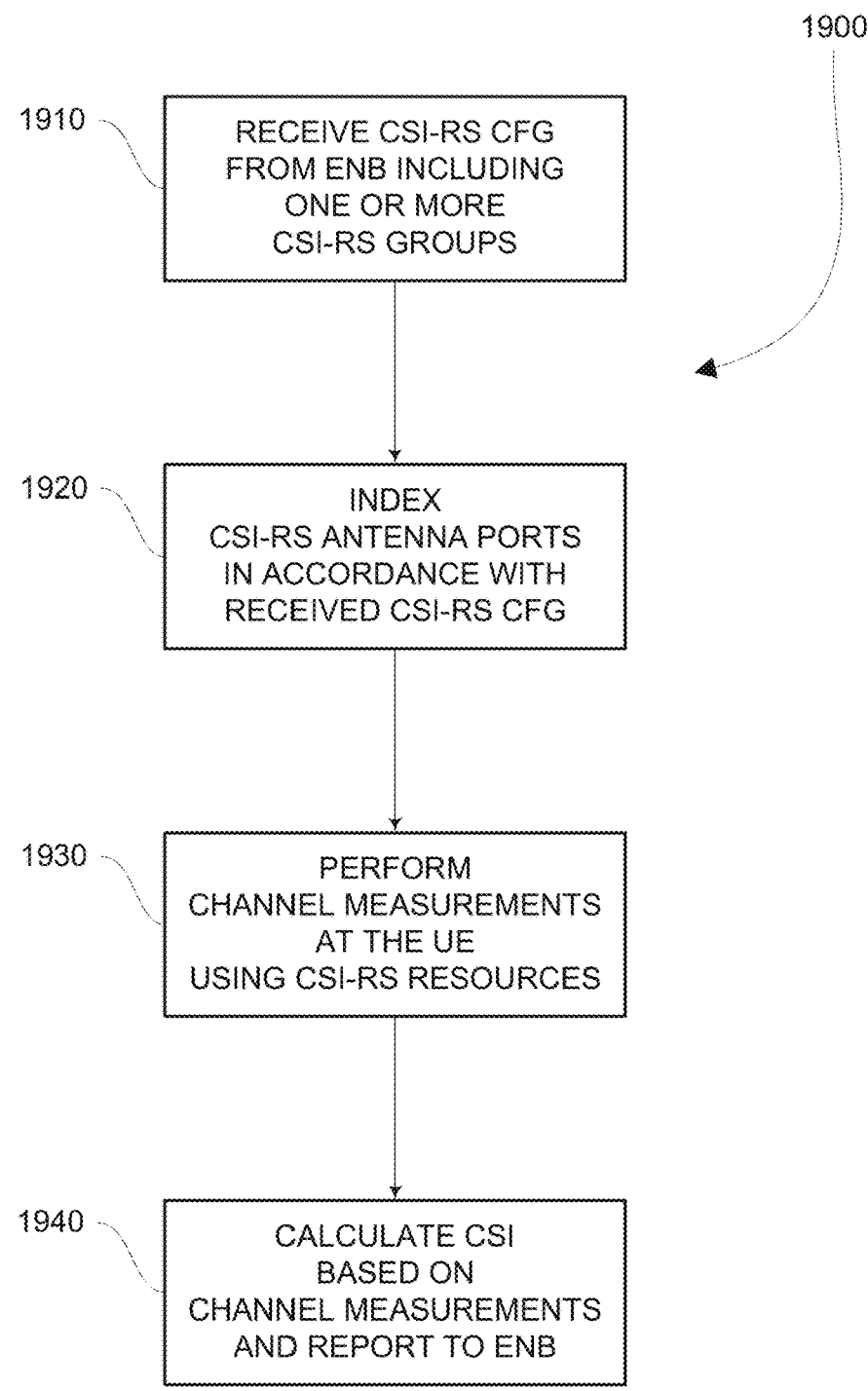

FIGS. 18-19 illustrate embodiments of methods for using CSI-RS groups in accordance with the CSI-RS protocol. With reference to FIG. 18, a method 1800 to be performed by an eNB may comprise an establishment 1810 of CSI-RS groups, a transmission 1820 of CSI-RS configuration messages, a transmission 1830 of CSI-RS symbols, and a receipt 1840 of calculated channel state information.

In various embodiments, establishment 1810 may include establishing one or more CSI-RS antenna ports specified by a first CSI-RS group assignment and one or more CSI-RS antenna ports specified by a second CSI-RS group assignment as being an ordered set of antenna ports for eNB 1510. The ordered set of antenna ports may in turn be at least part of a wireless communication channel associated with a corresponding set of receiving antenna ports for UE 1530.

Method 1800 may, in some embodiments, comprise associating a first antenna coupled to eNB 1510 with one or more antenna ports specified by the first CSI-RS group assignment, and associating a second antenna coupled to eNB 1510 with one or more antenna ports specified by the second CSI-RS group assignment, where the first antenna and the second antenna have orthogonal polarizations.

In some embodiments, method 1800 may comprise associating a first portion of the ordered set of antenna ports of eNB 1510 with one or more CSI-RS antenna ports specified by the first CSI-RS group assignment, and associating a second portion of the ordered set of antenna ports of eNB 1510 with one or more CSI-RS antenna ports specified by the second CSI-RS group assignment, where the second portion follows the first portion in the ordered set of antenna ports of eNB 1510. In other embodiments, method 1800 may comprise (1) associating a first CSI-RS antenna port specified by the first CSI-RS group assignment and a first CSI-RS antenna port specified by the second CSI-RS group assignment with a first portion of the ordered set of antenna ports of eNB 1510, and (2) associating a second CSI-RS antenna port specified by the first CSI-RS group assignment and a second CSI-RS antenna port specified by the second CSI-RS group assignment with a second portion of the ordered set of antenna ports of eNB 1510, where the second portion follows the first portion in the ordered set of antenna ports of eNB 1510.

Transmission 1820 may include transmitting the first CSI-RS group assignment and the second CSI-RS group assignment to UE 1530. Transmission 1830 may also include transmitting CSI-RS symbols to UE 1530, for use in taking channel state information measurements and in calculating channel state information. Receipt 1840 may include receiving a reporting message from UE 1530 containing calculated channel state information for the channel.

With reference to FIG. 19, a method 1900 to be performed by a UE may comprise a receipt 1910 of CSI-RS configuration messages, an indexing 1920 of CS-RS antenna ports, a performance 1930 of channel measurements, and a calculation 1940 of channel state information.

For example, in various embodiments, receipt 1910 may include receiving in from eNB 1510 an assignment of a first CSI-RS group specifying one or more CSI-RS antenna ports, and an assignment of a second CSI-RS group specifying one or more CSI-RS antenna ports. Indexing 1920 may include indexing the one or more CSI-RS antenna ports specified by the first CSI-RS group assignment and the one or more CSI-RS antenna ports specified by the second CSI-RS group assignment as an ordered list of CSI-RS antenna ports for at least part of a channel associated with a set of receiving antennas of the UE.

Performance 1930 may include performing channel state information measurements for the channel, and calculation 1940 may include calculating channel state information for the channel. Method 1900 may also comprise composing a reporting message to eNB 1510 containing the calculated channel state information for the channel.

In some embodiments, indexing 1920 may begin with all antenna ports specified by the first CSI-RS group assignment, then all antenna ports specified by the second CSI-RS group assignment. In other embodiments, indexing 1920 may interleave the one or more REs of the first CSI-RS group assignment with the one or more REs of the second CSI-RS group assignment. In still further embodiments, the first CSI-RS group assignment and the second CSI-RS group assignment may be contained in one message from eNB 1510 having an information element (IE) that specifies each CSI-RS group assignment as at least one asserted bit in an array of bits.

Although the blocks in the flowchart with reference to FIGS. 18-19 are shown in a particular order, the order of the actions can be modified. Thus, the illustrated embodiments can be performed in a different order, and some actions/blocks may be performed in parallel. Some of the blocks and/or operations listed in FIGS. 18-19 are optional in accordance with certain embodiments. The numbering of the blocks presented is for the sake of clarity and is not intended to prescribe an order of operations in which the various blocks must occur. Additionally, operations from the various flows may be utilized in a variety of combinations.

Moreover, in some embodiments, machine readable storage media may have executable instructions stored thereon that, when executed, cause eNB 1510 to perform an operation comprising method 1800. Similarly, in some embodiments, machine readable storage media may have executable instructions stored thereon that, when executed, cause UE 1530 to perform an operation comprising method 1900. Such machine readable storage media may include any of a variety of storage media, like magnetic storage media (e.g. magnetic tapes or magnetic disks), optical storage media (e.g. optical discs), electronic storage media (e.g. conventional hard disk drives, solid-state disk drives, or flash-memory-based storage media), or any other tangible storage media or non-transitory storage media.

Figure 20:
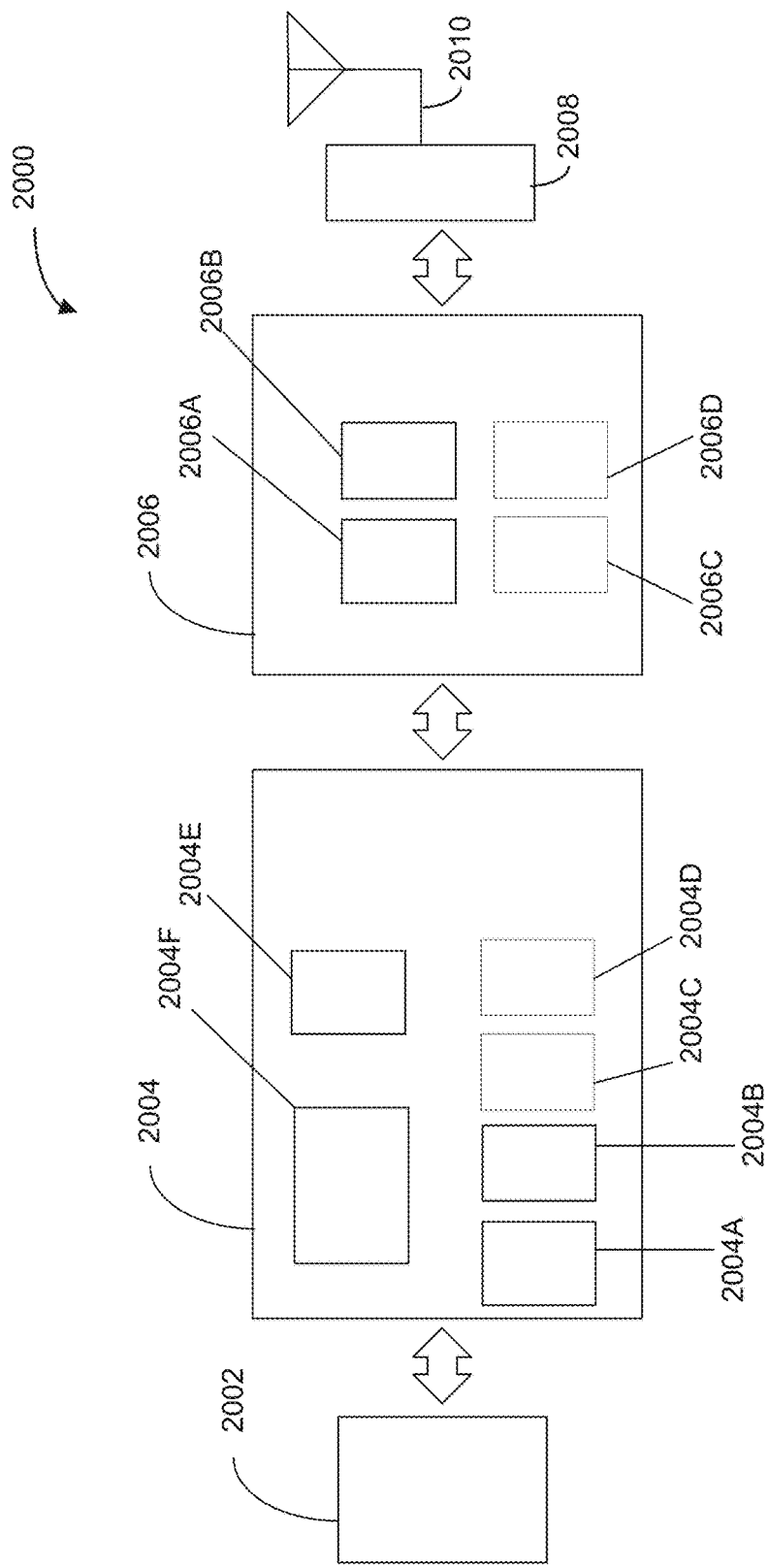
FIG. 20 illustrates example components of a UE device in accordance with some embodiments.

FIG. 20 illustrates example components of a UE device 2000 in accordance with some embodiments. In some embodiments, the UE device 2000 may include application circuitry 2002, baseband circuitry 2004, Radio Frequency (RF) circuitry 2006, front-end module (FEM) circuitry 2008, a low-power wake-up receiver (LP-WUR), and one or more antennas 2010, coupled together at least as shown. In some embodiments, the UE device 2000 may include additional elements such as, for example, memory/storage, display, camera, sensor, and/or input/output (I/O) interface.

The application circuitry 2002 may include one or more application processors. For example, the application circuitry 2002 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 2004 may include circuitry such as, but not limited to, one or more single-core or multi-core processors. The baseband circuitry 2004 may include one or more baseband processors and/or control logic to process baseband signals received from a receive signal path of the RF circuitry 2006 and to generate baseband signals for a transmit signal path of the RF circuitry 2006. Baseband processing circuitry 2004 may interface with the application circuitry 2002 for generation and processing of the baseband signals and for controlling operations of the RF circuitry 2006. For example, in some embodiments, the baseband circuitry 2004 may include a second generation (2G) baseband processor 2004a, third generation (3G) baseband processor 2004b, fourth generation (4G) baseband processor 2004c, and/or other baseband processor(s) 2004d for other existing generations, generations in development or to be developed in the future (e.g., fifth generation (5G), 6G, etc.). The baseband circuitry 2004 (e.g., one or more of baseband processors 2004a-d) may handle various radio control functions that enable communication with one or more radio networks via the RF circuitry 2006. The radio control functions may include, but are not limited to, signal modulation/demodulation, encoding/decoding, radio frequency shifting, etc. In some embodiments, modulation/demodulation circuitry of the baseband circuitry 2004 may include Fast-Fourier Transform (FFT), precoding, and/or constellation mapping/demapping functionality. In some embodiments, encoding/decoding circuitry of the baseband circuitry 2004 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 2004 may include elements of a protocol stack such as, for example, elements of an EUTRAN protocol including, for example, physical (PHY), media access control (MAC), radio link control (RLC), packet data convergence protocol (PDCP), and/or RRC elements. A central processing unit (CPU) 2004e of the baseband circuitry 2004 may be configured to run elements of the protocol stack for signaling of the PHY, MAC, RLC, PDCP and/or RRC layers. In some embodiments, the baseband circuitry may include one or more audio digital signal processor(s) (DSP) 2004f. The audio DSP(s) 2004f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 2004 and the application circuitry 2002 may be implemented together such as, for example, on a system on a chip (SOC).

In some embodiments, the baseband circuitry 2004 may provide for communication compatible with one or more radio technologies. For example, in some embodiments, the baseband circuitry 2004 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 2004 is configured to support radio communications of more than one wireless protocol may be referred to as multi-mode baseband circuitry.

RF circuitry 2006 may enable communication with wireless networks using modulated electromagnetic radiation through a non-solid medium. In various embodiments, the RF circuitry 2006 may include switches, filters, amplifiers, etc. to facilitate the communication with the wireless network. RF circuitry 2006 may include a receive signal path which may include circuitry to down-convert RF signals received from the FEM circuitry 2008 and provide baseband signals to the baseband circuitry 2004. RF circuitry 2006 may also include a transmit signal path which may include circuitry to up-convert baseband signals provided by the baseband circuitry 2004 and provide RF output signals to the FEM circuitry 2008 for transmission.

In some embodiments, the RF circuitry 2006 may include a receive signal path and a transmit signal path. The receive signal path of the RF circuitry 2006 may include mixer circuitry 2006a, amplifier circuitry 2006b and filter circuitry 2006c. The transmit signal path of the RF circuitry 2006 may include filter circuitry 2006c and mixer circuitry 2006a. RF circuitry 2006 may also include synthesizer circuitry 2006d for synthesizing a frequency for use by the mixer circuitry 2006a of the receive signal path and the transmit signal path. In some embodiments, the mixer circuitry 2006a of the receive signal path may be configured to down-convert RF signals received from the FEM circuitry 2008 based on the synthesized frequency provided by synthesizer circuitry 2006d. The amplifier circuitry 2006b may be configured to amplify the down-converted signals and the filter circuitry 2006c may be a low-pass filter (LPF) or band-pass filter (BPF) configured to remove unwanted signals from the down-converted signals to generate output baseband signals. Output baseband signals may be provided to the baseband circuitry 2004 for further processing. In some embodiments, the output baseband signals may be zero-frequency baseband signals, although this is not a requirement. In some embodiments, mixer circuitry 2006a of the receive signal path may comprise passive mixers, although the scope of the embodiments is not limited in this respect.

In some embodiments, the mixer circuitry 2006a of the transmit signal path may be configured to up-convert input baseband signals based on the synthesized frequency provided by the synthesizer circuitry 2006d to generate RF output signals for the FEM circuitry 2008. The baseband signals may be provided by the baseband circuitry 2004 and may be filtered by filter circuitry 2006c. The filter circuitry 2006c may include a low-pass filter (LPF), although the scope of the embodiments is not limited in this respect.

In some embodiments, the mixer circuitry 2006a of the receive signal path and the mixer circuitry 2006a of the transmit signal path may include two or more mixers and may be arranged for quadrature downconversion and/or upconversion respectively. In some embodiments, the mixer circuitry 2006a of the receive signal path and the mixer circuitry 2006a of the transmit signal path may include two or more mixers and may be arranged for image rejection (e.g., Hartley image rejection). In some embodiments, the mixer circuitry 2006a of the receive signal path and the mixer circuitry 2006a may be arranged for direct downconversion and/or direct upconversion, respectively. In some embodiments, the mixer circuitry 2006a of the receive signal path and the mixer circuitry 2006a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 2006 may include analog-to-digital converter (ADC) and digital-to-analog converter (DAC) circuitry and the baseband circuitry 2004 may include a digital baseband interface to communicate with the RF circuitry 2006.

In some dual-mode embodiments, a separate radio IC circuitry may be provided for processing signals for each spectrum, although the scope of the embodiments is not limited in this respect.

In some embodiments, the synthesizer circuitry 2006d may be a fractional-N synthesizer or a fractional N/N+1 synthesizer, although the scope of the embodiments is not limited in this respect as other types of frequency synthesizers may be suitable. For example, synthesizer circuitry 2006d may be a delta-sigma synthesizer, a frequency multiplier, or a synthesizer comprising a phase-locked loop with a frequency divider.

The synthesizer circuitry 2006d may be configured to synthesize an output frequency for use by the mixer circuitry 2006a of the RF circuitry 2006 based on a frequency input and a divider control input. In some embodiments, the synthesizer circuitry 2006d may be a fractional N/N+1 synthesizer.

In some embodiments, frequency input may be provided by a voltage controlled oscillator (VCO), although that is not a requirement. Divider control input may be provided by either the baseband circuitry 2004 or the applications processor 2002 depending on the desired output frequency. In some embodiments, a divider control input (e.g., N) may be determined from a look-up table based on a channel indicated by the applications processor 2002.

Synthesizer circuitry 2006d of the RF circuitry 2006 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 2006d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 2006 may include an IQ/polar converter.

FEM circuitry 2008 may include a receive signal path which may include circuitry configured to operate on RF signals received from one or more antennas 2010, amplify the received signals and provide the amplified versions of the received signals to the RF circuitry 2006 for further processing. FEM circuitry 2008 may also include a transmit signal path which may include circuitry configured to amplify signals for transmission provided by the RF circuitry 2006 for transmission by one or more of the one or more antennas 2010.

In some embodiments, the FEM circuitry 2008 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 2006). The transmit signal path of the FEM circuitry 2008 may include a power amplifier (PA) to amplify input RF signals (e.g., provided by RF circuitry 2006), and one or more filters to generate RF signals for subsequent transmission (e.g., by one or more of the one or more antennas 2010.

In some embodiments, the UE 2000 comprises a plurality of power saving mechanisms. If the UE 2000 is in an RRC_Connected state, where it is still connected to the eNB as it expects to receive traffic shortly, then it may enter a state known as Discontinuous Reception Mode (DRX) after a period of inactivity. During this state, the device may power down for brief intervals of time and thus save power.

If there is no data traffic activity for an extended period of time, then the UE 2000 may transition off to an RRC Idle state, where it disconnects from the network and does not perform operations such as channel quality feedback, handover, etc. The UE 2000 goes into a very low power state and it performs paging where again it periodically wakes up to listen to the network and then powers down again. The device cannot receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Figure 21:
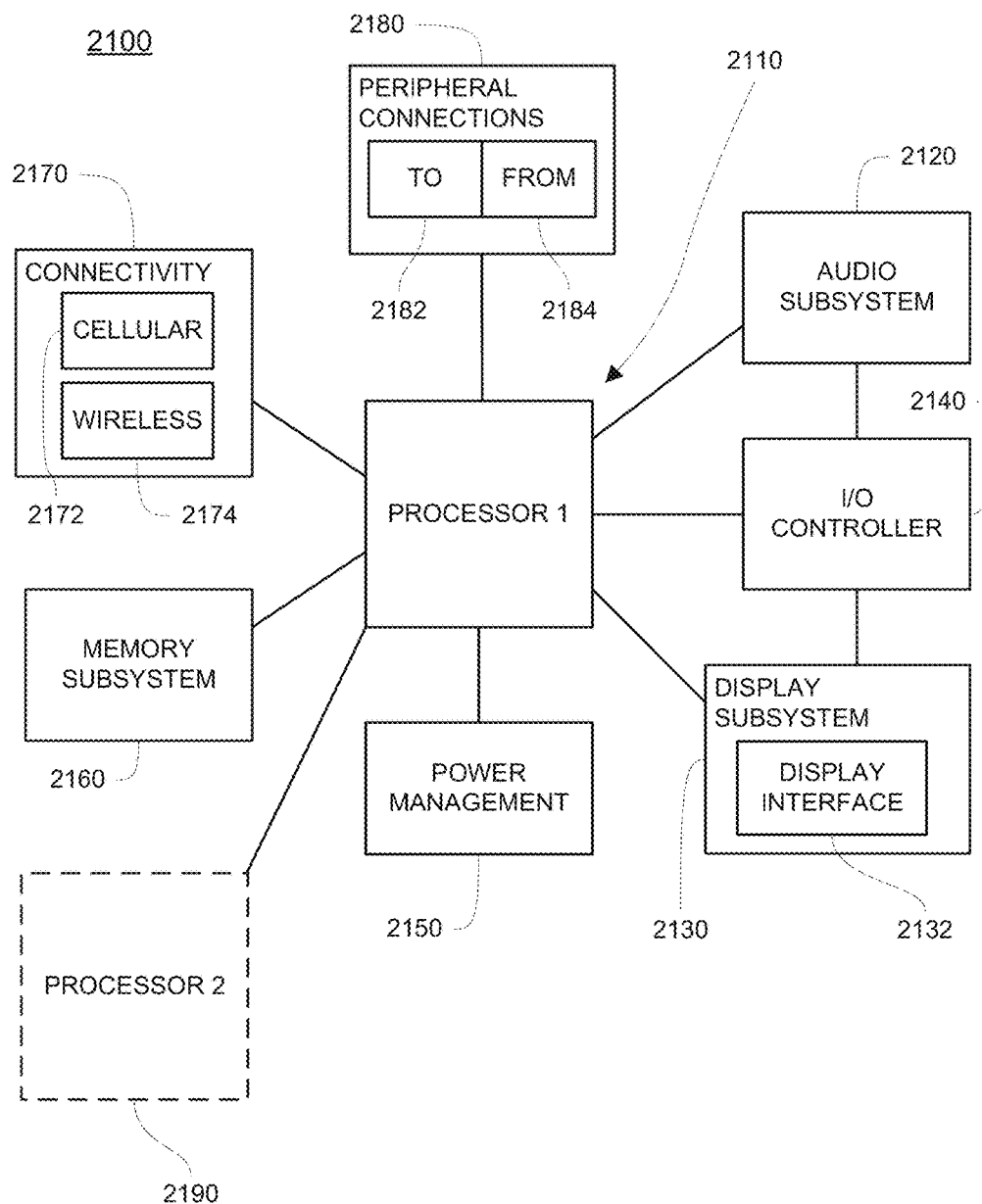
FIG. 21 illustrates a computing device with mechanisms to provide a flexible CSI-RS protocol, according to some embodiments of the disclosure.

FIG. 21 illustrates a computing device with mechanisms to provide a flexible CSI-RS protocol, according to some embodiments of the disclosure. It is pointed out that those elements of FIG. 21 having the same reference numbers (or names) as the elements of any other figure can operate or function in any manner similar to that described, but are not limited to such.

Computing device 2100 may be a smart device, smart phone, tablet, SoC, or computer system with mechanisms to provide a flexible CSI-RS protocol, according to some embodiments of the disclosure. FIG. 21 illustrates a block diagram of an embodiment of a mobile device which may be operable to use flat surface interface connectors. In one embodiment, computing device 2100 may be a mobile computing device, such as a computing tablet, a mobile phone or smart-phone, a wireless-enabled e-reader, or other wireless mobile device. It will be understood that certain components are shown generally, and not all components of such a device are shown in computing device 2100.

Computing device 2100 includes a first processor 2110 with mechanisms to provide a flexible CSI-RS protocol, according to some embodiments discussed. Other blocks of computing device 2100 may also include the mechanisms to provide a flexible CSI-RS protocol, according to other embodiments. The various embodiments of the present disclosure may also comprise a network interface within 2170 such as a wireless interface so that a system embodiment may be incorporated into a wireless device, for example a cell phone or personal digital assistant.

In some embodiments, processor 2110 can include one or more physical devices, such as microprocessors, application processors, microcontrollers, programmable logic devices, or other processing means. The processing operations performed by processor 2110 may include the execution of an operating platform or operating system on which applications and/or device functions may then be executed. The processing operations may also include operations related to one or more of the following: I/O (input/output) with a human user or with other devices; power management; connecting computing device 2100 to another device; audio I/O; and/or display I/O.

In some embodiments, computing device 2100 includes an audio subsystem 2120, which represents hardware components (e.g., audio hardware and audio circuits) and software components (e.g., drivers and/or codecs) associated with providing audio functions to computing device 2100. Audio functions can include speaker and/or headphone output as well as microphone input. Devices for such functions can be integrated into computing device 2100, or connected to computing device 2100. In one embodiment, a user interacts with computing device 2100 by providing audio commands that are received and processed by processor 2110.

In some embodiments, computing device 2100 includes a display subsystem 2130, which represents hardware components (e.g., display devices) and software components (e.g., drivers) that provide a visual and/or tactile display for a user to interact with computing device 2100. Display subsystem 2130 may include a display interface 2132, which may be a particular screen or hardware device used to provide a display to a user. In one embodiment, display interface 2132 includes logic separate from processor 2110 to perform at least some processing related to the display. In some embodiments, display subsystem 2130 includes a touch screen (or touch pad) device that provides both output and input to a user.

In some embodiments, computing device 2100 includes an I/O controller 2140 associated with hardware devices and software components related to interaction with a user. I/O controller 2140 is operable to manage hardware that is part of audio subsystem 2120 and/or display subsystem 2130. Additionally, I/O controller 2140 may be a connection point for additional devices that connect to computing device 2100, through which a user might interact with the system. For example, devices that can be attached to computing device 2100 might include microphone devices, speaker or stereo systems, video systems or other display devices, keyboard or keypad devices, or other I/O devices for use with specific applications such as card readers or other devices.

As mentioned above, I/O controller 2140 can interact with audio subsystem 2120 and/or display subsystem 2130. For example, input through a microphone or other audio device can provide input or commands for one or more applications or functions of computing device 2100. Additionally, audio output can be provided instead of, or in addition to, display output. In another example, if display subsystem 2130 includes a touch screen, the display device may also act as an input device, which can be at least partially managed by I/O controller 2140. There can also be additional buttons or switches on computing device 2100 to provide I/O functions managed by I/O controller 2140.

In some embodiments, I/O controller 2140 manages devices such as accelerometers, cameras, light sensors or other environmental sensors, or other hardware that can be included in computing device 2100. The input can be part of direct user interaction, and may provide environmental input to the system to influence its operations (such as filtering for noise, adjusting displays for brightness detection, applying a flash for a camera, or other features).

In some embodiments, computing device 2100 includes a power management component 2150 that manages battery power usage, charging of the battery, and features related to power saving operation.

A memory subsystem 2160 includes memory devices for storing information in computing device 2100. Memory subsystem 2160 can include nonvolatile memory devices (whose state does not change if power to the memory device is interrupted) and/or volatile memory devices (whose state is indeterminate if power to the memory device is interrupted). Memory subsystem 2160 can store application data, user data, music, photos, documents, or other data, as well as system data (whether long-term or temporary) related to the execution of the applications and functions of computing device 2100.

Some portion of memory subsystem 2160 may also be provided as a non-transitory machine-readable medium for storing the computer-executable instructions (e.g., instructions to implement any other processes discussed herein). The machine-readable medium may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, some embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, computing device 2100 includes a network interface within a connectivity component 2170, such as a cellular interface 2172 or a wireless interface 2174, so that an embodiment of computing device 2100 may be incorporated into a wireless device such as a cellular phone or a personal digital assistant. In some embodiments, connectivity component 2170 includes hardware devices (e.g., wireless and/or wired connectors and communication hardware) and software components (e.g., drivers and/or protocol stacks) to enable computing device 2100 to communicate with external devices. Computing device 2100 could include separate devices, such as other computing devices, wireless access points or base stations, as well as peripherals such as headsets, printers, or other devices.

In some embodiments, connectivity component 2170 can include multiple different types of network interfaces, such as one or more wireless interfaces for allowing processor 2110 to communicate with another device. To generalize, computing device 2100 is illustrated with cellular interface 2172 and wireless interface 2174. Cellular interface 2172 refers generally to wireless interfaces to cellular networks provided by cellular network carriers, such as provided via GSM or variations or derivatives, CDMA (code division multiple access) or variations or derivatives, TDM (time division multiplexing) or variations or derivatives, or other cellular service standards. Wireless interface 2174 refers generally to non-cellular wireless interfaces, and can include personal area networks (such as Bluetooth, Near Field, etc.), local area networks (such as Wi-Fi), and/or wide area networks (such as WiMax), or other wireless communication.

In some embodiments, computing device 2100 has various peripheral connections 2180, which may include hardware interfaces and connectors, as well as software components (e.g., drivers and/or protocol stacks) to make peripheral connections. It will be understood that computing device 2100 could both be a peripheral device to other computing devices (via "to" 2182), as well as have peripheral devices connected to it (via "from" 2184). The computing device 2100 may have a "docking" connector to connect to other computing devices for purposes such as managing content on computing device 2100 (e.g., downloading and/or uploading, changing, synchronizing). Additionally, a docking connector can allow computing device 2100 to connect to certain peripherals that allow computing device 2100 to control content output, for example, to audiovisual or other systems.

In addition to a proprietary docking connector or other proprietary connection hardware, computing device 2100 can make peripheral connections 2180 via common or standards-based connectors. Common types of connectors can include a Universal Serial Bus (USB) connector (which can include any of a number of different hardware interfaces), a DisplayPort or MiniDisplayPort (MDP) connector, a High Definition Multimedia Interface (HDMI) connector, a Firewire connector, or other types of connectors.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following enumerated examples pertain to further embodiments. Specifics in the examples may be used anywhere in one or more embodiments. All optional features of the apparatus described herein may also be implemented with respect to a method or process.

Example 1 provides a User Equipment (UE) operable to communicate with an Evolved Node-B (eNB) on a network. The UE may include hardware processing circuitry comprising a set of antennas, a first circuitry, and a second circuitry. The first circuitry may be operable to receive Channel State Information Reference Signal (CSI RS) configuration messages from the eNB that assign to the UE a CSI RS group specifying one or more CSI RS antenna ports. The second circuitry may be operable to index a first set of CSI RS antenna ports specified by a first assigned CSI RS group and a second set of CSI RS antenna ports specified by a second assigned CSI RS group as an ordered list of CSI RS antenna ports for at least part of a channel associated with the set of antennas.

In example 2, the UE of example 1 is provided, in which the second circuitry may be operable to perform channel state information measurements on the ordered list of CSI RS antenna ports. The first assigned CSI RS group may correspond with a CSI RS configuration having 2, 4, or 8 antenna ports as defined in TS 36.211 v. 10.7.0, and CSI RS symbols for the ordered list of CSI RS antenna ports are transmitted in the same downlink subframe.

In example 3, the UE of example 2 is provided, in which the second circuitry may be operable to calculate channel state information based on the channel state information measurements. In example 4, the UE of example 3 is provided, in which the first circuitry may be operable to compose a reporting message to the eNB containing the calculated channel state information.

In example 5, the UE of any of examples 1 through 4 is provided, in which the second circuitry may be operable to index the ordered list of CSI RS antenna ports beginning with all antenna ports specified by the first assigned CSI RS group, then all antenna ports specified by the second assigned CSI RS group.

In example 6, the UE of any of examples 1 through 4 is provided, in which the second circuitry may be operable to index the ordered list of CSI RS antenna ports beginning with a first portion of the antenna ports specified by the first assigned CSI RS group and a first portion of the antenna ports specified by the second assigned CSI RS group, followed by a second portion of the antenna ports specified by the first assigned CSI RS group and a second portion of the antenna ports specified by the second assigned CSI RS group.

In example 7, the UE of example 6 is provided, in which the first portion of the antenna ports may be a first half of the antenna ports, and the second portion of the antenna ports may be a second half of the antenna ports.

In example 8, the UE of any of examples 1 through 4 is provided, in which the first assigned CSI RS group and the second assigned CSI RS group may be contained in one message from the eNB having an information element (IE) that specifies each CSI RS group as at least one asserted bit in an array of bits.

In example 9, the UE of any of examples 1 through 8 is provided, in which the first circuitry and the second circuitry may be part of a baseband circuitry of the UE.

In example 10, a device comprising an application processor, a memory, one or more antennas, a wireless interface for allowing the application processor to communicate with another device, and a touch-screen display may be provided, the device including the UE of any of examples 1 through 9.

Example 11 provides an apparatus of a User Equipment (UE) comprising an application processor, a memory, a set of antennas, and a wireless interface for allowing the application processor to communicate with another device. The apparatus may include a first circuitry and a second circuitry. The first circuitry may be operable to receive Channel State Information Reference Signal (CSI RS) configuration messages from the eNB that assign to the UE a CSI RS group specifying one or more CSI RS antenna ports. The second circuitry may be operable to index a first set of CSI RS antenna ports specified by a first assigned CSI RS group and a second set of CSI RS antenna ports specified by a second assigned CSI RS group as an ordered list of CSI RS antenna ports for at least part of a channel associated with the set of antennas.

In example 12, the apparatus of the UE of example 11 is provided, in which the second circuitry may be operable to perform channel state information measurements on the ordered list of CSI RS antenna ports. The first assigned CSI RS group may correspond with a CSI RS configuration having 2, 4, or 8 antenna ports as defined in TS 36.211 v. 10.7.0. CSI RS symbols for the ordered list of CSI RS antenna ports may be transmitted in the same downlink subframe.

In example 13, the apparatus of the UE of example 12 is provided, in which the second circuitry may be operable to calculate channel state information based on the channel state information measurements.

In example 14, the apparatus of the UE of example 13 is provided, in which the first circuitry may be operable to compose a reporting message to the eNB containing the calculated channel state information.

In example 15, the apparatus of the UE of any of examples 11 through 14 is provided, in which the second circuitry may be operable to index the ordered list of CSI RS antenna ports beginning with all antenna ports specified by the first assigned CSI RS group, then all antenna ports specified by the second assigned CSI RS group.

In example 16, the apparatus of the UE of any of examples 11 through 14 is provided, in which the second circuitry may be operable to index the ordered list of CSI RS antenna ports beginning with a first portion of the antenna ports specified by the first assigned CSI RS group and a first portion of the antenna ports specified by the second assigned CSI RS group, followed by a second portion of the antenna ports specified by the first assigned CSI RS group and a second portion of the antenna ports specified by the second assigned CSI RS group.

In example 17, the apparatus of the UE of example 16 is provided, in which the first portion of the antenna ports may be a first half of the antenna ports, and the second portion of the antenna ports may be a second half of the antenna ports.

In example 18, the apparatus of the UE of any of examples 11 through 14 is provided, in which the first assigned CSI RS group and the second assigned CSI RS group may be contained in one message from the eNB having an information element (IE) that specifies each CSI RS group as at least one asserted bit in an array of bits.

In example 19, the apparatus of the UE of any of examples 11 through 18 is provided, in which the apparatus may be a baseband circuitry of the UE.

Example 20 provides an Evolved Node-B (eNB) operable to communicate with a User Equipment (UE) on a network. The eNB may include hardware processing circuitry may comprise an ordered set of antenna ports, a first circuitry, and a second circuitry. The ordered set of antenna ports may be for at least part of a channel associated with a set of receiving antennas of the UE. The first circuitry may be operable to compose CSI RS configuration messages that assign to the UE a Channel State Information Reference Signal (CSI RS) group specifying one or more CSI RS antenna ports. The second circuitry may be operable to establish CSI RS group assignments for an ordered list of CSI RS antenna ports corresponding with the ordered set of antenna ports of the eNB. The ordered list of CSI RS antenna ports may include one or more antenna ports specified by a first assigned CSI RS group, and may include one or more antenna ports specified by a second assigned CSI RS group.

In example 21, the eNB of example 20 is provided, in which the first circuitry may be operable to receive a reporting message from the UE containing calculated channel state information for the channel based on channel state information measurements on the ordered list of CSI RS antenna ports.

In example 22, the eNB of either of examples 20 or 21 is provided, in which the second circuitry may be operable to establish the one or more antenna ports specified by the first assigned CSI RS group as being associated with a first antenna coupled to the eNB, and may be operable to establish the one or more antenna ports specified by the second assigned CSI RS group as being associated with a second antenna coupled to the eNB. The first antenna and second antenna may have orthogonal polarizations.

In example 23, the eNB of any of examples 20 through 22 is provided, in which the second circuitry may be operable to establish the one or more antenna ports specified by the first assigned CSI RS group as being associated with a first portion of the ordered set of antenna ports of the eNB, and may be operable to establish the one or more antenna ports specified by the second assigned CSI RS group as being associated with a second portion of the ordered set of antenna ports of the eNB. The second portion may follow the first portion in the ordered set of antenna ports of the eNB.

In example 24, the eNB of example 23 is provided, in which wherein the first portion of the antenna ports may be a first half of the antenna ports, and the second portion of the antenna ports may be a second half of the antenna ports.

In example 25, the eNB of any of examples 20 through 22 is provided, in which the second circuitry may be operable to establish a first antenna port specified by the first assigned CSI RS group and a first antenna port specified by the second assigned CSI RS group as being associated with a first portion of the ordered set of antenna ports of the eNB, and may be operable to establish a second antenna port specified by the first assigned CSI RS group and a second antenna port specified by the second assigned CSI RS group as being associated with a second portion of the ordered set of antenna ports of the eNB. The second portion may follow the first portion in the ordered set of antenna ports of the eNB.

In example 26, the eNB of any of examples 20 through 22 is provided, in which the first assigned CSI RS group and the second assigned CSI RS group may be contained in one message to the UE having an information element (IE) that specifies each CSI RS group as at least one asserted bit in an array of bits.

In example 27, the eNB of any of examples 20 through 25 is provided, in which the first assigned CSI RS group is transmitted in a first message to the UE and the second assigned CSI RS group is transmitted in a second message to the UE.

Example 28 provides a machine readable storage media having machine executable instructions stored thereon that, when executed, cause a User Equipment (UE) to perform an operation. The operation may comprise receiving in the UE, from an Evolved Node-B (eNB), an assignment of a first Channel State Information Reference Signal (CSI RS) group specifying one or more CSI RS antenna ports, and an assignment of a second CSI RS group specifying one or more CSI RS antenna ports. The operation may also comprise indexing the one or more antenna ports specified by the first CSI RS group assignment and the one or more antenna ports specified by the second CSI RS group assignment as an ordered list of CSI RS antenna ports for at least part of a channel associated with a set of receiving antennas of the UE.

In example 29, the machine readable storage media of example 28 is provided, in which the operation may comprise performing channel state information measurements for the channel. The operation may also comprise calculating channel state information for the channel. The operation may also comprise composing a reporting message to the eNB containing the calculated channel state information for the channel.

In example 30, the machine readable storage media of either of examples 28 or 29 is provided, in which the indexing may begin with all antenna ports specified by the first CSI RS group assignment, then all antenna ports specified by the second CSI RS group assignment.

In example 31, the machine readable storage media of either of examples 28 or 29 is provided in which the indexing may interleave the one or more REs of the first CSI RS group assignment with the one or more REs of the second CSI RS group assignment.

In example 32, the machine readable storage media of any of examples 28 through 31 is provided, in which the first CSI RS group assignment and the second CSI RS group assignment may be contained in one message from the eNB having an information element (IE) that specifies each CSI RS group assignment as at least one asserted bit in an array of bits.

Example 33 provides a machine readable storage media having machine executable instructions stored thereon that, when executed, cause an Evolved Node-B (eNB) to perform an operation. The operation may comprise establishing one or more Channel State Information Reference Signal (CSI RS) antenna ports specified by a first CSI RS group assignment and one or more CSI RS antenna ports specified by a second CSI RS group assignment as being an ordered set of antenna ports of the eNB for at least part of a channel associated with a set of receiving antennas for a User Equipment (UE). The operation may also comprise transmitting to the UE the first CSI RS group assignment and the second CSI RS group assignment.

In example 34, the machine readable storage media of example 33 is provided, in which the operation may comprise receiving a reporting message from the UE containing calculated channel state information for the channel.

In example 35, the machine readable storage media of either of examples 33 or 34 is provided, in which the operation may comprise associating a first antenna coupled to the eNB with the one or more antenna ports specified by the first CSI RS group assignment. The operation may also comprise associating a second antenna coupled to the eNB with the one or more antenna ports specified by the second CSI RS group assignment, the first antenna and the second antenna having orthogonal polarizations.

In example 36, the machine readable storage media of any of examples 33 through 34 is provided, in which the operation may comprise associating a first portion of the ordered set of antenna ports of the eNB with one or more antenna ports specified by the first CSI RS group assignment, and may comprise associating a second portion of the ordered set of antenna ports of the eNB with one or more antenna ports specified by the second CSI RS group assignment. The second portion may follow the first portion in the ordered set of antenna ports of the eNB.

In example 37, the machine readable storage media of any of examples 33 through 35 is provided, in which the operation may comprise associating a first antenna port specified by the first CSI RS group assignment and a first antenna port specified by the second CSI RS group assignment with a first portion of the ordered set of antenna ports of the eNB, and may comprise associating a second antenna port specified by the first CSI RS group assignment and a second antenna port specified by the second CSI RS group assignment with a second portion of the ordered set of antenna ports of the eNB. The second portion may follow the first portion in the ordered set of antenna ports of the eNB.

Example 38 provides a method performed by a User Equipment (UE) to communicate with an Evolved Node-B (eNB) on a network. The method may comprise receiving in the UE, from an eNB, an assignment of a first Channel State Information Reference Signal (CSI RS) group specifying one or more CSI RS antenna ports, and an assignment of a second CSI RS group specifying one or more CSI RS antenna ports. The method may also comprise indexing the one or more antenna ports specified by the first CSI RS group assignment and the one or more antenna ports specified by the second CSI RS group assignment as an ordered list of CSI RS antenna ports for at least part of a channel associated with a set of receiving antennas of the UE.

In example 39, the method of example 38 is provided. The method may comprise performing channel state information measurements for the channel. The method may also comprise calculating channel state information for the channel. The method may also comprise composing a reporting message to the eNB containing the calculated channel state information for the channel.

In example 40, the method of either of examples 38 or 39 is provided, in which the indexing may begin with all antenna ports specified by the first CSI RS group assignment, then all antenna ports specified by the second CSI RS group assignment.

In example 41, the method of either of examples 38 or 39 is provided, in which the indexing may interleave the one or more REs of the first CSI RS group assignment with the one or more REs of the second CSI RS group assignment.

In example 42, the method of any of examples 38 through 41 is provided, in which the first CSI RS group assignment and the second CSI RS group assignment may be contained in one message from the eNB having an information element (IE) that specifies each CSI RS group assignment as at least one asserted bit in an array of bits.

In example 43, a machine readable storage media is provided, wherein the media has machine executable instructions stored thereon that, when executed, cause one or more processors (such as one or more processors of the UE) to perform a method according to any of examples 38 through 42.

Example 44 provides a method performed by an Evolved Node-B (eNB) to communicate with one or more User Equipments (UEs) on a network. The method may comprise establishing one or more Channel State Information Reference Signal (CSI RS) antenna ports specified by a first CSI RS group assignment and one or more CSI RS antenna ports specified by a second CSI RS group assignment as being an ordered set of antenna ports of the eNB for at least part of a channel associated with a set of receiving antennas for a User Equipment (UE). The method may also comprise transmitting to the UE the first CSI RS group assignment and the second CSI RS group assignment.

In example 45, the method of example 44 is provided. The method may comprise receiving a reporting message from the UE containing calculated channel state information for the channel.

In example, 46, the method of either of examples 44 or 45 is provided. The method may comprise associating a first antenna coupled to the eNB with the one or more antenna ports specified by the first CSI RS group assignment, and may comprise associating a second antenna coupled to the eNB with the one or more antenna ports specified by the second CSI RS group assignment. The first antenna and the second antenna may have orthogonal polarizations.

In example 47, the method of any of examples 44 through 46 is provided. The method may comprise associating a first portion of the ordered set of antenna ports of the eNB with one or more antenna ports specified by the first CSI RS group assignment, and may also comprise associating a second portion of the ordered set of antenna ports of the eNB with one or more antenna ports specified by the second CSI RS group assignment. The second portion may follow the first portion in the ordered set of antenna ports of the eNB.

In example 48, the method of any of examples 44 through 46 is provided. The method may comprise associating a first antenna port specified by the first CSI RS group assignment and a first antenna port specified by the second CSI RS group assignment with a first portion of the ordered set of antenna ports of the eNB, and may comprise associating a second antenna port specified by the first CSI RS group assignment and a second antenna port specified by the second CSI RS group assignment with a second portion of the ordered set of antenna ports of the eNB. The second portion may follow the first portion in the ordered set of antenna ports of the eNB.

In example 49, a machine readable storage media is provided, wherein the media has machine executable instructions stored thereon that, when executed, cause one or more processor (such as one or more processors of the eNB) to perform a method according to any of examples 44 through 48.

Example 50 provides a User Equipment (UE) operable to communicate with an Evolved Node-B (eNB) on a network, the UE including hardware processing circuitry that may comprise means for receiving in the UE, from an eNB, an assignment of a first Channel State Information Reference Signal (CSI RS) group specifying one or more CSI RS antenna ports, and an assignment of a second CSI RS group specifying one or more CSI RS antenna ports. The hardware processing circuitry may also comprise means for indexing the one or more antenna ports specified by the first CSI RS group assignment and the one or more antenna ports specified by the second CSI RS group assignment as an ordered list of CSI RS antenna ports for at least part of a channel associated with a set of receiving antennas of the UE.

In example 51, the UE including hardware processing circuitry of example 50 is provided, in which the hardware processing circuitry may comprise means for performing channel state information measurements for the channel. The hardware processing circuitry may also comprise means for calculating channel state information for the channel. The hardware processing circuitry may also comprise means for composing a reporting message to the eNB containing the calculated channel state information for the channel.

In example 52, the UE including hardware processing circuitry of either of examples 50 or 51 is provided, in which the indexing begins with all antenna ports specified by the first CSI RS group assignment, then all antenna ports specified by the second CSI RS group assignment.

In example 53, the UE including hardware processing circuitry of either of examples 50 or 51 is provided, in which the indexing interleaves the one or more REs of the first CSI RS group assignment with the one or more REs of the second CSI RS group assignment.

In example 54, the UE including hardware processing circuitry of any of examples 50 through 53 is provided, in which the first CSI RS group assignment and the second CSI RS group assignment are contained in one message from the eNB having an information element (IE) that specifies each CSI RS group assignment as at least one asserted bit in an array of bits.

In example 55, an Evolved Node-B (eNB) operable to communicate with a User Equipment (UE) on a network is provided, the eNB including hardware processing circuitry that may comprise means for establishing one or more Channel State Information Reference Signal (CSI RS) antenna ports specified by a first CSI RS group assignment and one or more CSI RS antenna ports specified by a second CSI RS group assignment as being an ordered set of antenna ports of the eNB for at least part of a channel associated with a set of receiving antennas for a User Equipment (UE). The hardware processing circuitry may also comprise means for transmitting to the UE the first CSI RS group assignment and the second CSI RS group assignment.

In example 56, the eNB including hardware processing circuitry of example 55 is provided, in which the hardware processing circuitry may comprise means for receiving a reporting message from the UE containing calculated channel state information for the channel.

In example 57, the eNB including hardware processing circuitry of example 55 or 56 is provided, which may comprise means for associating a first antenna coupled to the eNB with the one or more antenna ports specified by the first CSI RS group assignment. The hardware processing circuitry may also comprise means for associating a second antenna coupled to the eNB with the one or more antenna ports specified by the second CSI RS group assignment, the first antenna and the second antenna having orthogonal polarizations.

In example 58, the eNB including hardware processing circuitry of examples 55 through 57 is provided, in which the hardware processing circuitry may comprise means for associating a first portion of the ordered set of antenna ports of the eNB with one or more antenna ports specified by the first CSI RS group assignment. The hardware processing circuitry may also comprise means for associating a second portion of the ordered set of antenna ports of the eNB with one or more antenna ports specified by the second CSI RS group assignment, the second portion following the first portion in the ordered set of antenna ports of the eNB.

In example 59, the eNB including hardware processing circuitry of any of examples 55 through 57, in which the hardware processing circuitry may comprise means for associating a first antenna port specified by the first CSI RS group assignment and a first antenna port specified by the second CSI RS group assignment with a first portion of the ordered set of antenna ports of the eNB. The hardware processing circuitry may also comprise means for associating a second antenna port specified by the first CSI RS group assignment and a second antenna port specified by the second CSI RS group assignment with a second portion of the ordered set of antenna ports of the eNB, the second portion following the first portion in the ordered set of antenna ports of the eNB.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. An apparatus of a User Equipment (UE) comprising an application processor, a memory, a set of antennas, and a wireless interface for allowing the application processor to communicate with another device, wherein the apparatus includes:
a first circuitry operable to receive Channel State Information Reference Signal (CSI-RS) configuration messages from an eNB that assign to the UE a CSI-RS group specifying one or more CSI-RS antenna ports; and
a second circuitry operable to index a first set of CSI-RS antenna ports specified by a first assigned CSI-RS group and a second set of CSI-RS antenna ports specified by a second assigned CSI-RS group as an ordered list of CSI-RS antenna ports for at least part of a channel associated with the set of antennas,
wherein the second circuitry is operable to index the ordered list of CSI RS antenna ports beginning with a first portion of the antenna ports specified by the first assigned CSI RS group and a first portion of the antenna ports specified by the second assigned CSI RS group, followed by a second portion of the antenna ports specified by the first assigned CSI RS group and a second portion of the antenna ports specified by the second assigned CSI RS group.

2. The apparatus of the UE of claim 1, wherein the second circuitry is operable to perform channel state information measurements on the ordered list of CSI-RS antenna ports, wherein the first assigned CSI-RS group corresponds with a CSI-RS configuration having 2, 4, or 8 antenna ports as defined in TS 36.211 v. 10.7.0, and wherein CSI-RS symbols for the ordered list of CSI-RS antenna ports are transmitted in the same downlink subframe.

3. The apparatus of the UE of claim 2, wherein the second circuitry is operable to calculate channel state information based on the channel state information measurements.

4. The apparatus of the UE of claim 3, wherein the first circuitry is operable to compose a reporting message to the eNB containing the calculated channel state information.

5. The apparatus of the UE of claim 1, wherein the second circuitry is operable to index the ordered list of CSI-RS antenna ports beginning with all antenna ports specified by the first assigned CSI-RS group, then all antenna ports specified by the second assigned CSI-RS group.

6. The apparatus of the UE of claim 1, wherein the first portion of the antenna ports is a first half of the antenna ports, and wherein the second portion of the antenna ports is a second half of the antenna ports.

7. The apparatus of the UE of claim 1, wherein the first assigned CSI-RS group and the second assigned CSI-RS group are contained in one message from the eNB having an information element (IE) that specifies each CSI-RS group as at least one asserted bit in an array of bits.

8. The apparatus of the UE of claim 1, wherein the apparatus is a baseband circuitry of the UE.

9. An Evolved Node-B (eNB) operable to communicate with a User Equipment (UE) on a network, the eNB including hardware processing circuitry comprising:
an ordered set of antenna ports for at least part of a channel associated with a set of receiving antennas of the UE;
a first circuitry operable to compose CSI-RS configuration messages that assign to the UE a Channel State Information Reference Signal (CSI-RS) group specifying one or more CSI-RS antenna ports; and
a second circuitry operable to establish CSI-RS group assignments for an ordered list of CSI-RS antenna ports corresponding with the ordered set of antenna ports of the eNB, the ordered list of CSI-RS antenna ports including one or more antenna ports specified by a first assigned CSI-RS group, and including one or more antenna ports specified by a second assigned CSI-RS group;
wherein the second circuitry is operable to establish the one or more antenna ports specified by the first assigned CSI-RS group as being associated with a first antenna coupled to the eNB, and to establish the one or more antenna ports specified by the second assigned CSI-RS group as being associated with a second antenna coupled to the eNB, the first antenna and second antenna having orthogonal polarizations.

10. The eNB of claim 9, wherein the first circuitry is operable to receive a reporting message from the UE containing calculated channel state information for the channel based on channel state information measurements on the ordered list of CSI-RS antenna ports.

11. The eNB of claim 9, wherein the second circuitry is operable to establish the one or more antenna ports specified by the first assigned CSI-RS group as being associated with a first portion of the ordered set of antenna ports of the eNB, and to establish the one or more antenna ports specified by the second assigned CSI-RS group as being associated with a second portion of the ordered set of antenna ports of the eNB, the second portion following the first portion in the ordered set of antenna ports of the eNB.

12. The eNB of claim 11, wherein the first portion of the antenna ports is a first half of the antenna ports, and wherein the second portion of the antenna ports is a second half of the antenna ports.

13. The eNB of claim 9, wherein the second circuitry is operable to establish a first antenna port specified by the first assigned CSI-RS group and a first antenna port specified by the second assigned CSI-RS group as being associated with a first portion of the ordered set of antenna ports of the eNB, and to establish a second antenna port specified by the first assigned CSI-RS group and a second antenna port specified by the second assigned CSI-RS group as being associated with a second portion of the ordered set of antenna ports of the eNB, the second portion following the first portion in the ordered set of antenna ports of the eNB.

14. The eNB of claim 9, wherein the first assigned CSI-RS group and the second assigned CSI-RS group are contained in one message to the UE having an information element (IE) that specifies each CSI-RS group as at least one asserted bit in an array of bits.

15. The eNB of claim 9, wherein the first assigned CSI-RS group is transmitted in a first message to the UE and the second assigned CSI-RS group is transmitted in a second message to the UE.

16. Non-transitory machine readable storage media having machine executable instructions stored thereon that, when executed, cause a User Equipment (UE) to perform an operation comprising:
receive in the UE, from an Evolved Node-B (eNB), an assignment of a first Channel State Information Reference Signal (CSI-RS) group specifying one or more CSI-RS antenna ports, and an assignment of a second CSI-RS group specifying one or more CSI-RS antenna ports; and
index the one or more antenna ports specified by the first CSI-RS group assignment and the one or more antenna ports specified by the second CSI-RS group assignment as an ordered list of CSI-RS antenna ports for at least part of a channel associated with a set of receiving antennas of the UE,
wherein the indexing interleaves the one or more REs of the first CSI-RS group assignment with the one or more REs of the second CSI-RS group assignment.

17. The machine readable storage media of claim 16, wherein the indexing begins with all antenna ports specified by the first CSI-RS group assignment, then all antenna ports specified by the second CSI-RS group assignment.

18. The machine readable storage media of claim 16, wherein the first CSI-RS group assignment and the second CSI-RS group assignment are contained in one message from the eNB having an information element (IE) that specifies each CSI-RS group assignment as at least one asserted bit in an array of bits.

19. Non-transitory machine readable storage media having machine executable instructions stored thereon that, when executed, cause an Evolved Node-B (eNB) to perform an operation comprising:
establish one or more Channel State Information Reference Signal (CSI-RS) antenna ports specified by a first CSI-RS group assignment and one or more CSI-RS antenna ports specified by a second CSI-RS group assignment as being an ordered set of antenna ports of the eNB for at least part of a channel associated with a set of receiving antennas for a User Equipment (UE);
transmit to the UE the first CSI-RS group assignment and the second CSI-RS group assignment;
associate a first antenna coupled to the eNB with the one or more antenna ports specified by the first CSI-RS group assignment; and
associate a second antenna coupled to the eNB with the one or more antenna ports specified by the second CSI-RS group assignment, the first antenna and the second antenna having orthogonal polarizations.

20. The machine readable storage media of claim 19, having machine executable instructions stored thereon that, when executed, cause the eNB to perform an operation comprising:
associate a first portion of the ordered set of antenna ports of the eNB with one or more antenna ports specified by the first CSI-RS group assignment; and
associate a second portion of the ordered set of antenna ports of the eNB with one or more antenna ports specified by the second CSI-RS group assignment, the second portion following the first portion in the ordered set of antenna ports of the eNB.

21. The machine readable storage media of claim 19, having machine executable instructions stored thereon that, when executed, cause the eNB to perform an operation comprising:
associate a first antenna port specified by the first CSI-RS group assignment and a first antenna port specified by the second CSI-RS group assignment with a first portion of the ordered set of antenna ports of the eNB; and
associate a second antenna port specified by the first CSI-RS group assignment and a second antenna port specified by the second CSI-RS group assignment with a second portion of the ordered set of antenna ports of the eNB, the second portion following the first portion in the ordered set of antenna ports of the eNB.

* * * * *